(12) United States Patent
Saori

(10) Patent No.: US 7,307,794 B2
(45) Date of Patent: Dec. 11, 2007

(54) ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/223,915

(22) Filed: Sep. 13, 2005

(65) Prior Publication Data
US 2006/0061873 A1    Mar. 23, 2006

(30) Foreign Application Priority Data
Sep. 17, 2004  (JP) ............................. 2004-271931
Sep. 17, 2004  (JP) ............................. 2004-271932

(51) Int. Cl.
*G02B 15/14* (2006.01)
(52) U.S. Cl. ...................... 359/686; 359/683
(58) Field of Classification Search ............... 359/683, 359/686
See application file for complete search history.

(56) References Cited

U.S. PATENT DOCUMENTS

| | | | |
|---|---|---|---|
| 5,132,848 A * | 7/1992 | Nishio et al. | ............... 359/686 |
| 5,576,890 A | 11/1996 | Tanaka et al. | |
| 5,710,669 A | 1/1998 | Endo | |
| 5,805,351 A * | 9/1998 | Hayashi | ...................... 359/686 |
| 6,317,271 B1 | 11/2001 | Sensui | |
| 6,710,931 B1 | 3/2004 | Misaka | |
| 6,833,967 B2 | 12/2004 | Sekita | |
| 2002/0163736 A1* | 11/2002 | Endo | ......................... 359/686 |

2004/0223230 A1    11/2004    Saori

FOREIGN PATENT DOCUMENTS

| | | |
|---|---|---|
| JP | 5-241073 | 9/1993 |
| JP | 7-261084 | 10/1995 |
| JP | 10-325923 | 12/1998 |
| JP | 11-174328 | 7/1999 |
| JP | 2000-338397 | 12/2000 |
| JP | 2001-318314 | 11/2001 |
| JP | 2002-287031 | 10/2002 |
| JP | 2002-311330 | 10/2002 |

OTHER PUBLICATIONS

English Language Abstract of JP 5-241073.
English Language Abstract of JP 7-261084.
English Language Abstract of JP 10-325923.
English Language Abstract of JP 2000-338397.
English Language Abstract of JP 2002-287031.
English Language Abstract of JP 2002-311330.

* cited by examiner

*Primary Examiner*—Ricky Mack
*Assistant Examiner*—William C Choi
(74) *Attorney, Agent, or Firm*—Greenblum & Bernstein, P.L.C.

(57) ABSTRACT

A zoom lens system includes a negative first lens group, a positive second lens group, a diaphragm, a negative third lens group, and a positive fourth lens group, in this order from the object. The negative third lens group includes cemented lens elements having a positive lens element and a negative lens element. The positive fourth lens group includes a positive single lens element, and cemented lens elements having a positive lens element and a negative lens element, in this order from the object.

22 Claims, 19 Drawing Sheets

SPHERICAL ABERRATION THE SINE CONDITION

SPHERICAL ABERRATION CHROMATIC ABERRATION

LATERAL CHROMATIC ABERRATION

ASTIGMATISM

DISTORTION

Fig. 3
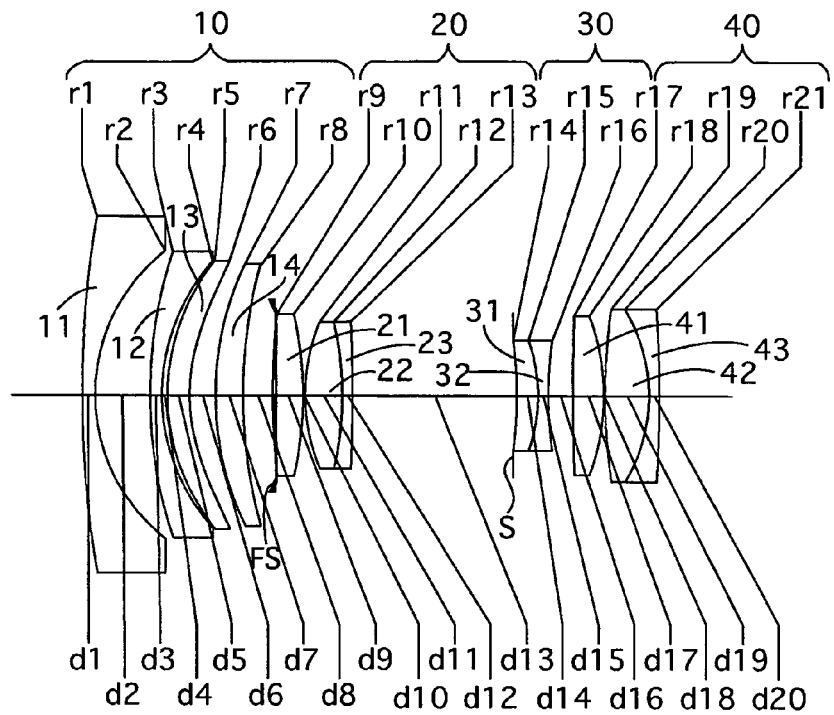
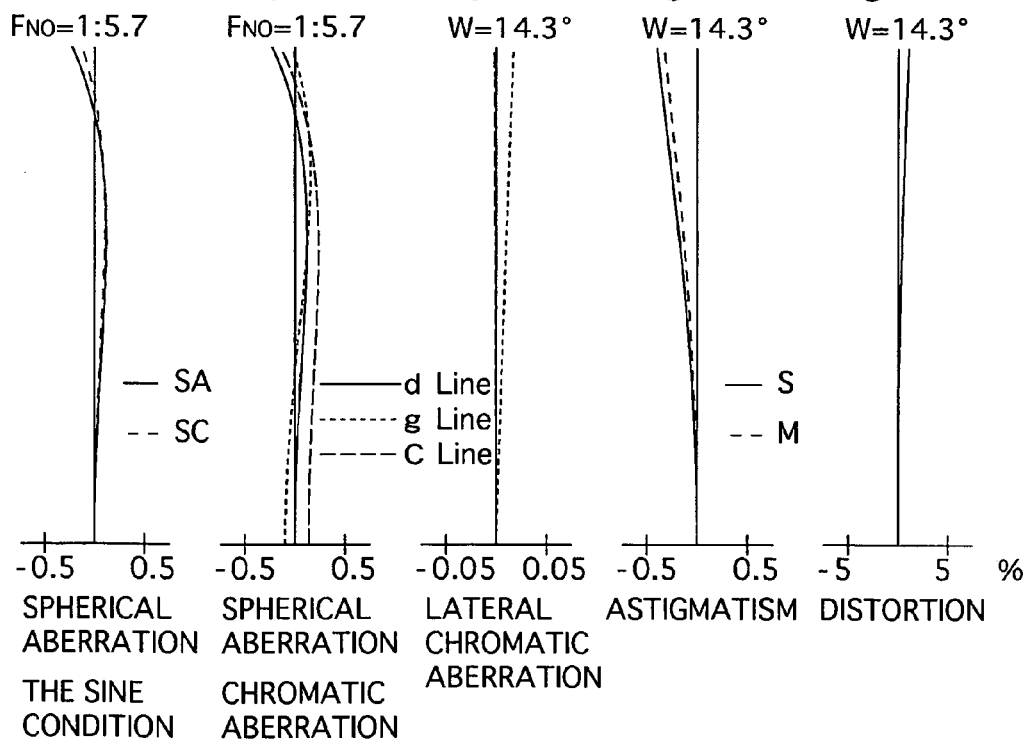
Fig. 4A  Fig. 4B  Fig. 4C  Fig. 4D  Fig. 4E

Fig.15
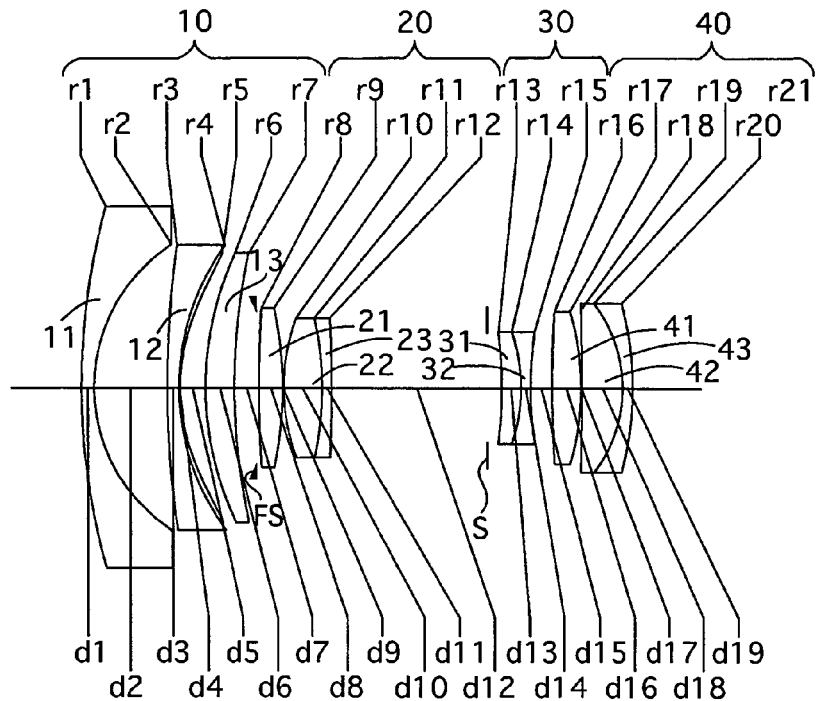
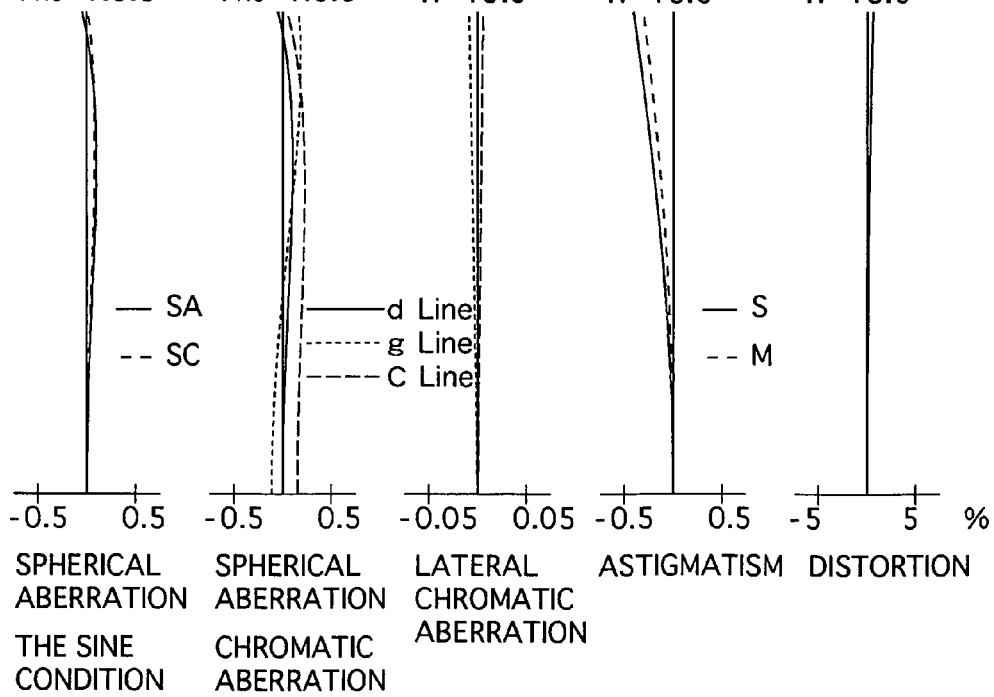
Fig.16A Fig.16B Fig.16C Fig.16D Fig.16E

Fig.29
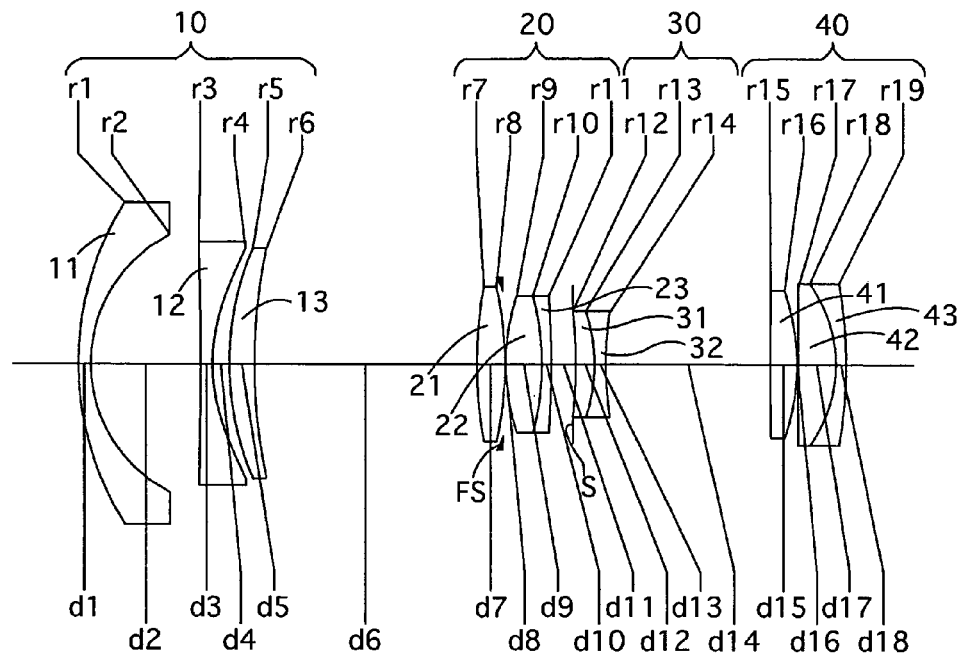
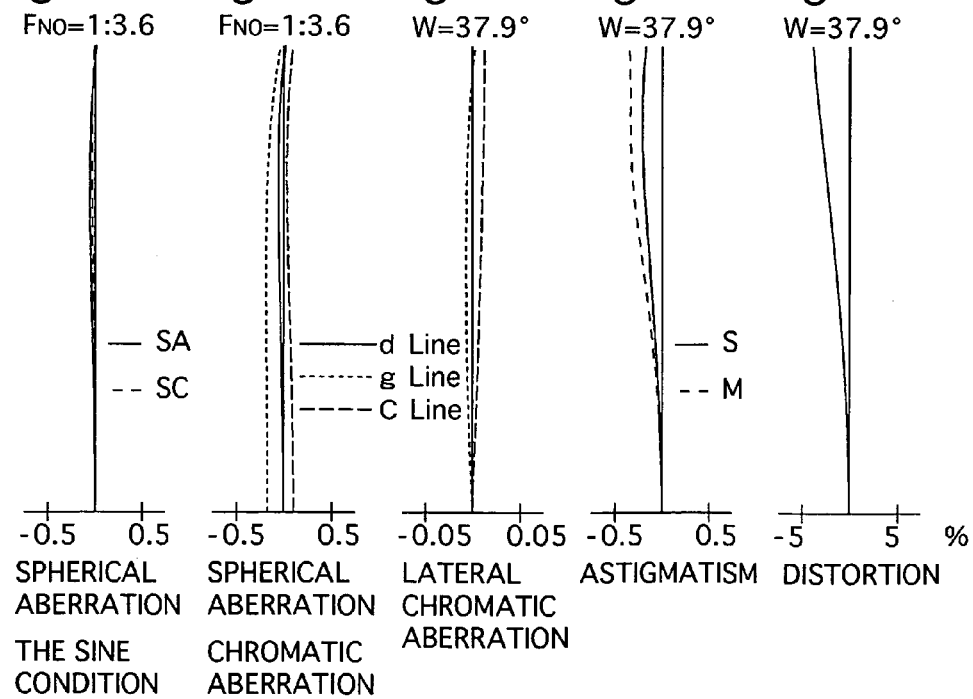
Fig.30A   Fig.30B   Fig.30C   Fig.30D   Fig.30E

Fig.31
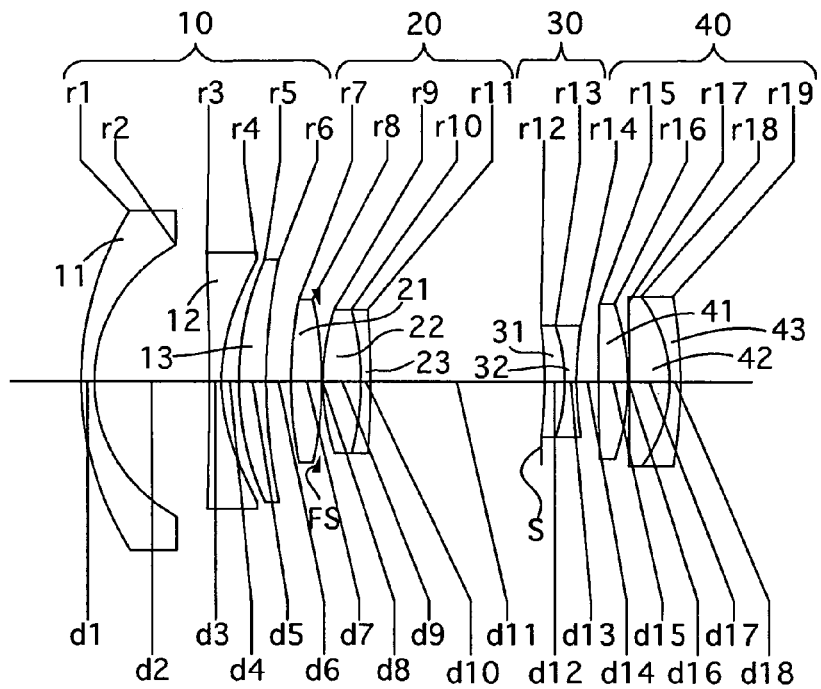
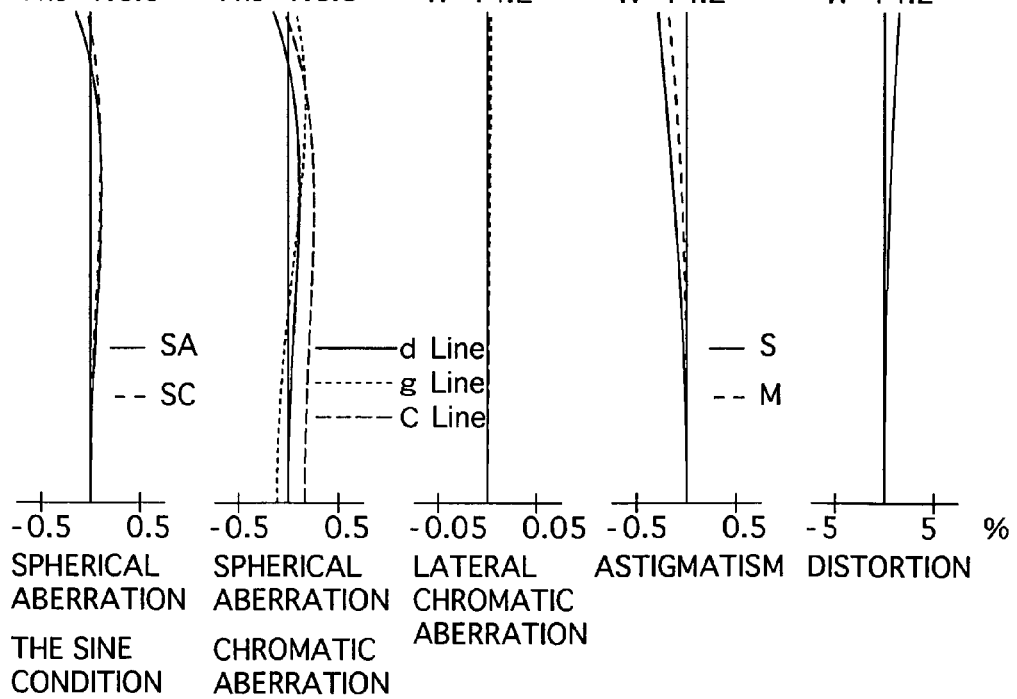
Fig.32A  Fig.32B  Fig.32C  Fig.32D  Fig.32E

Fig.33
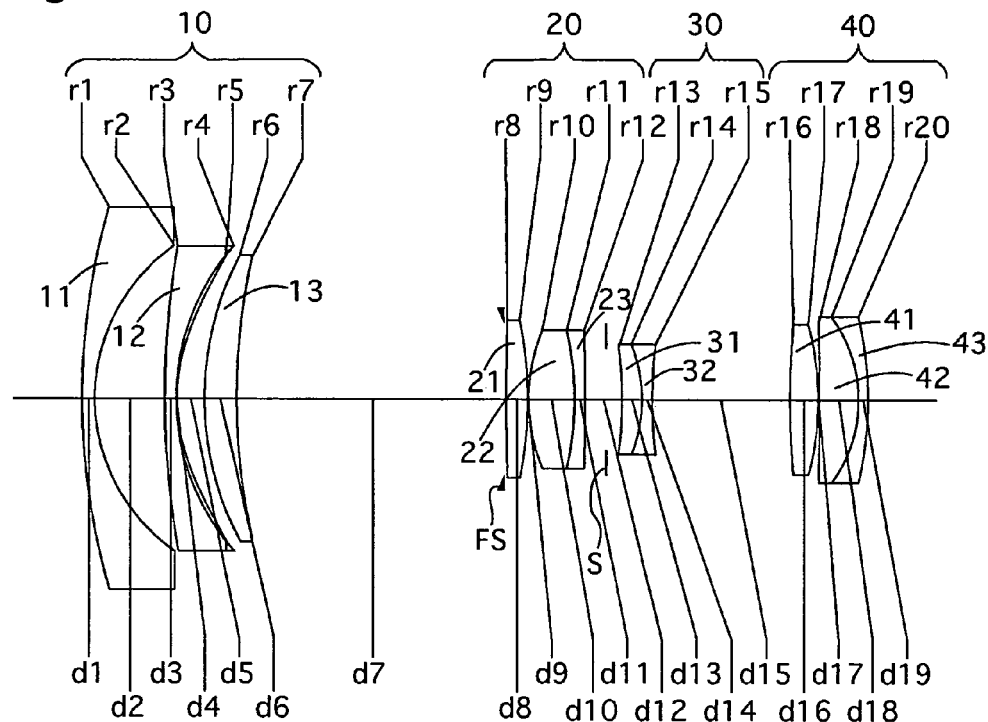
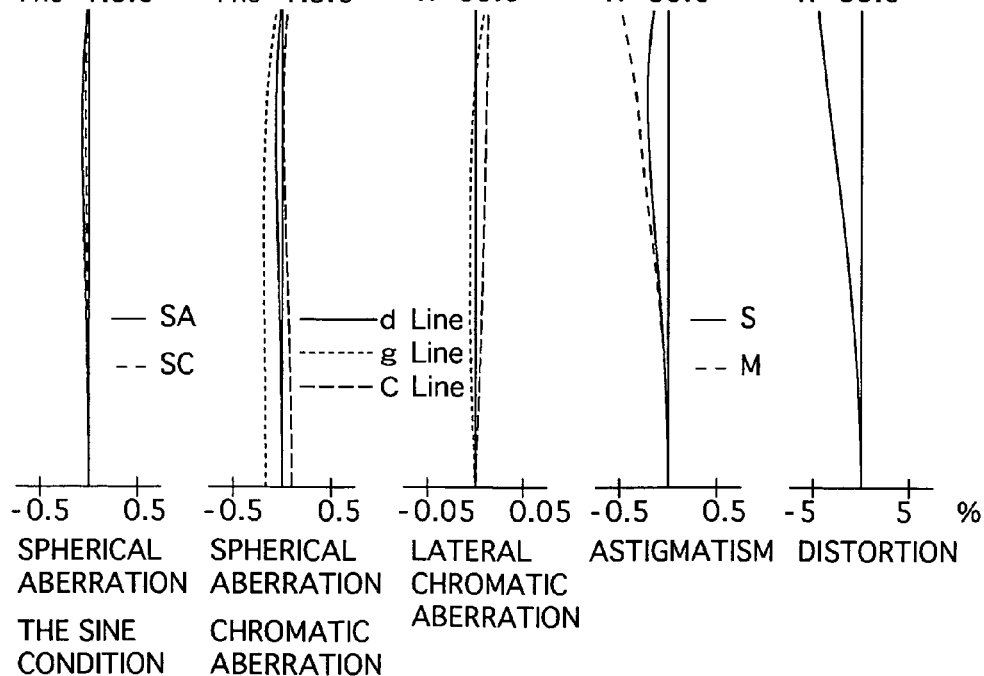
Fig.34A  Fig.34B  Fig.34C  Fig.34D  Fig.34E

ZOOM LENS SYSTEM

BACKGROUND OF THE INVENTION

1. Field of the Invention

The present invention relates to a zoom lens system for a single lens reflex camera (a SLR camera), and in particular, a zoom lens system suitable for a digital SLR camera.

2. Description of the Related Art

A digital SLR camera has used an imaging device having an imaging surface which is smaller than the imaging surface of a SLR camera with a silver halide film (hereinafter, a silver-halide-film SLR camera). This is because it has been difficult to achieve a larger imaging device.

Accordingly, in the case where an exchangeable photographing lens system with a predetermined focal length is used with a digital SLR camera, the angle-of-view thereof becomes narrower than the case where the same exchangeable photographing lens system is used with a silver-halide-film SLR camera. Therefore an exchangeable photographing lens system having a shorter focal length is desired for a digital SLR camera.

On the other hand, the back focal distance of a digital SLR camera is required to be longer. This is because the lens mount and the flange back have been made common to both digital and silver-halide-film SLR cameras so that the various types of exchangeable photographing lens systems for silver-halide-film SLR cameras on the market can be utilized for digital SLR cameras.

In order to satisfy the above requirements for a digital SLR camera, it is advantageous to employ a negative-lead type zoom lens system of a four-lens-group arrangement, i.e., a first lens group having a negative refractive power (hereinafter, a negative first lens group), a second lens group having a positive refractive power (hereinafter, a positive second lens group), a third lens group having a negative refractive power (hereinafter, a negative third lens group) and a fourth lens group having a positive refractive power (hereinafter, a positive fourth lens group), in this order from the object.

However, in a conventional negative-lead type zoom lens system of a four-lens-group arrangement, the structure of the negative third lens group and that of the positive fourth lens group have been complicated; and the production costs thereof have increased. Furthermore, in the above conventional negative-lead type zoom lens system, distribution of refractive power over each lens group has not been sufficiently considered, so that the amount of peripheral illumination tends to be decreased.

SUMMARY OF THE INVENTION

The present invention provides a negative-lead type zoom lens system of a four-lens-group arrangement, i.e., a negative first lens group, a positive second lens group, a negative third lens group and a positive fourth lens group, in this order from the object, which can simplify the structure of the negative third lens group and that of the positive fourth lens group, and can reduce the production costs of the zoom lens system.

Furthermore, the above negative-lead type zoom lens system of a four-lens-group arrangement is provided to attain the following features by appropriately distributing refractive power over each of the four lens groups:

(i) the angle-of-view of 75° or more at a focal length of 20 mm or less at the short focal length extremity;

(ii) the zoom ratio of approximately 3;

(iii) at the short focal length extremity, the back focal distance is long with respect to a focal length thereat; and (iv) off-axis aberration at the short focal length extremity and on-axis aberration at the long focal length extremity can be balanced when the necessary amount peripheral illumination is secured at the short focal length extremity.

According to a first aspect of the present invention, there is provided a zoom lens system including a negative first lens group, a positive second lens group, a diaphragm, a negative third lens group, and a positive fourth lens group, in this order from the object.

The negative third lens group includes cemented lens elements having a positive lens element and a negative lens element.

The positive fourth lens group includes a positive single lens element, and cemented lens elements having a positive lens element and a negative lens element, in this order from the object.

In the cemented lens elements of the positive fourth lens group, the positive lens element is preferably on the object side, and the negative lens element is on the image side, from the viewpoint of the correcting of aberrations.

Further, the cemented lens elements of the positive fourth lens group can be arranged to have either a negative refractive power or a positive refractive power; however, the cemented lens elements thereof as a whole is preferably arranged to have a positive refractive power from the viewpoint of the correcting of aberrations.

The final lens element, i.e., the most image-side lens element, of the positive fourth lens group is preferably a negative meniscus lens element having the convex surface facing toward the image.

The negative third lens group and the positive fourth lens group of the zoom lens system of the present invention preferably satisfies the following conditions:

$$1.0 < |fi(i=3)|/fw < 2.5 \quad (1)$$

$$1.3 < fi(i=4)/fw < 2.5 \quad (2)$$

wherein fi designates the focal length of the $i^{th}$ lens group ($1 \leq i \leq 4$); and fw designates the focal length of the zoom lens system at the short focal length extremity.

The zoom lens system of the present invention preferably satisfies the following conditions when the negative first lens group is arranged to be a focusing lens group:

$$0.4 < |fi(i=1)|/fBw < 0.8 \quad (3)$$

$$1.0 < fi(i=4)/fi(i=2)/ < 1.8 \quad (4)$$

wherein fi designates the focal length of the $i^{th}$ lens group ($1 \leq i \leq 4$); and fBw designates the back focal distance at the short focal length extremity.

The zoom lens system of the present invention preferably satisfies the following condition:

$$0.5 < |fi(i=1)|/(fw \times ft)^{1/2} < 1.2 \quad (5)$$

wherein fi designates the focal length of the $i^{th}$ lens group ($1 \leq i \leq 4$);

fw designates the focal length of the zoom lens system at the short focal length extremity; and ft designates the focal length of the zoom lens system at the long focal length extremity.

In the zoom lens system of the first aspect of the present invention, it is preferable to provide a fixed-aperture diaphragm in the close vicinity of the most object-side lens element of the positive second lens group to more suitably correct off-axis aberration at the short focal length extremity and a focal length range in the vicinity thereof, while (i) the reduction of peripheral illumination at the short focal length extremity is prevented, (ii) the diameter of the negative first lens group is made smaller, and (iii) the structure of the negative third lens group and that of the positive fourth lens group are made simpler.

In addition, it is preferable to form the diaphragm provided between the positive second lens group and the negative third lens group as a variable-aperture diaphragm.

Still further, it is preferable to provide an aspherical surface in the negative first lens group to more suitably correct off-axis aberration at the short focal length extremity and a focal length range in the vicinity thereof, while (i) the reduction of peripheral illumination at the short focal length extremity is prevented, and (ii) the structure of the negative third lens group and that of the positive fourth lens group are made simpler.

According to a second aspect of the present invention, there is provided a zoom lens system including a negative first lens group, a positive second lens group, a diaphragm, a negative third lens group, and a positive fourth lens group, in this order from the object.

The negative first lens group is arranged to be a focusing lens group.

The zoom lens system satisfies the following conditions:

$$0.4 < |fi(i=1)|/fBw < 0.8 \quad (3)$$

$$1.0 < fi(i=4)/fi(i=2) < 1.8 \quad (4)$$

wherein fi designates the focal length of the $i^{th}$ lens group ($1 \leq i \leq 4$); and fBw designates the back focal distance at the short focal length extremity.

The zoom lens system of the second aspect of the present invention preferably satisfies the following condition:

$$0.5 < |fi(i=1)|/(fw \times ft)^{1/2} < 1.2 \quad (5)$$

wherein fi designates the focal length of the $i^{th}$ lens group ($1 \leq i \leq 4$);

fw designates the focal length of the zoom lens system at the short focal length extremity; and ft designates the focal length of the zoom lens system at the long focal length extremity.

The zoom lens system of the second aspect of the present invention preferably satisfies the following condition:

$$1.3 < |fi(i=3)|/fw < 2.0 \quad (1'')$$

wherein fi designates the focal length of the $i^{th}$ lens group ($1 \leq i \leq 4$); and fw designates the focal length of the zoom lens system at the short focal length extremity.

In the zoom lens system of the second aspect of the present invention, it is preferable to provide a fixed-aperture diaphragm in the close vicinity of the most object-side lens element of the positive second lens group to more suitably correct off-axis aberration at the short focal length extremity and a focal length range in the vicinity thereof, while (i) the reduction of peripheral illumination at the short focal length extremity is prevented, and (ii) the diameter of the negative first lens group is made smaller.

In addition, it is preferable to form the diaphragm provided between the positive second lens group and the negative third lens group as a variable-aperture diaphragm.

Furthermore, it is preferable to provide an aspherical surface in the negative first lens group to more suitably correct off-axis aberration at the short focal length extremity and a focal length range in the vicinity thereof, while (i) the diameter of the negative first lens group is made smaller, and (ii) the reduction of peripheral illumination at the short focal length extremity is prevented.

The zoom lens system of the second aspect of the present invention preferably satisfies the following conditions:

$$1.0 < |fi(i=1)|/fw < 1.8 \quad (6)$$

$$1.2 < fi(i=2)/fw < 1.8 \quad (7)$$

$$1.5 < fi(i=4)/fw < 2.2 \quad (2'')$$

The present disclosure relates to subject matters contained in Japanese Patent Application No. 2004-271931 and Japanese Patent Application No. 2004-271932 (both filed on Sep. 17, 2004) which are expressly incorporated herein in their entireties.

BRIEF DESCRIPTION OF THE DRAWINGS

The present invention will be discussed below in detail with reference to the accompanying drawings, in which:

FIG. 3 is a lens arrangement of the zoom lens system at the long focal length extremity, according to the first embodiment of the present invention;

FIGS. 4A, 4B, 4C, 4D and 4E show aberrations occurred in the lens arrangement shown in FIG. 3;

FIG. 15 is a lens arrangement of the zoom lens system at the long focal length extremity, according to the fourth embodiment of the present invention;

FIGS. 16A, 16B, 16C, 16D and 16E show aberrations occurred in the lens arrangement shown in FIG. 15;

FIG. 29 is a lens arrangement of the zoom lens system at the short focal length extremity, according to an eighth embodiment of the present invention;

FIGS. 30A, 30B, 30C, 30D and 30E show aberrations occurred in the lens arrangement shown in FIG. 29;

FIG. 31 is a lens arrangement of the zoom lens system at the long focal length extremity, according to the eighth embodiment of the present invention;

FIGS. 32A, 32B, 32C, 32D and 32E show aberrations occurred in the lens arrangement shown in FIG. 31;

FIG. 33 is a lens arrangement of the zoom lens system at the short focal length extremity, according to a ninth embodiment of the present invention;

FIGS. 34A, 34B, 34C, 34D and 34E show aberrations occurred in the lens arrangement shown in FIG. 33;

DESCRIPTION OF THE PREFERRED EMBODIMENTS

Figure 37:
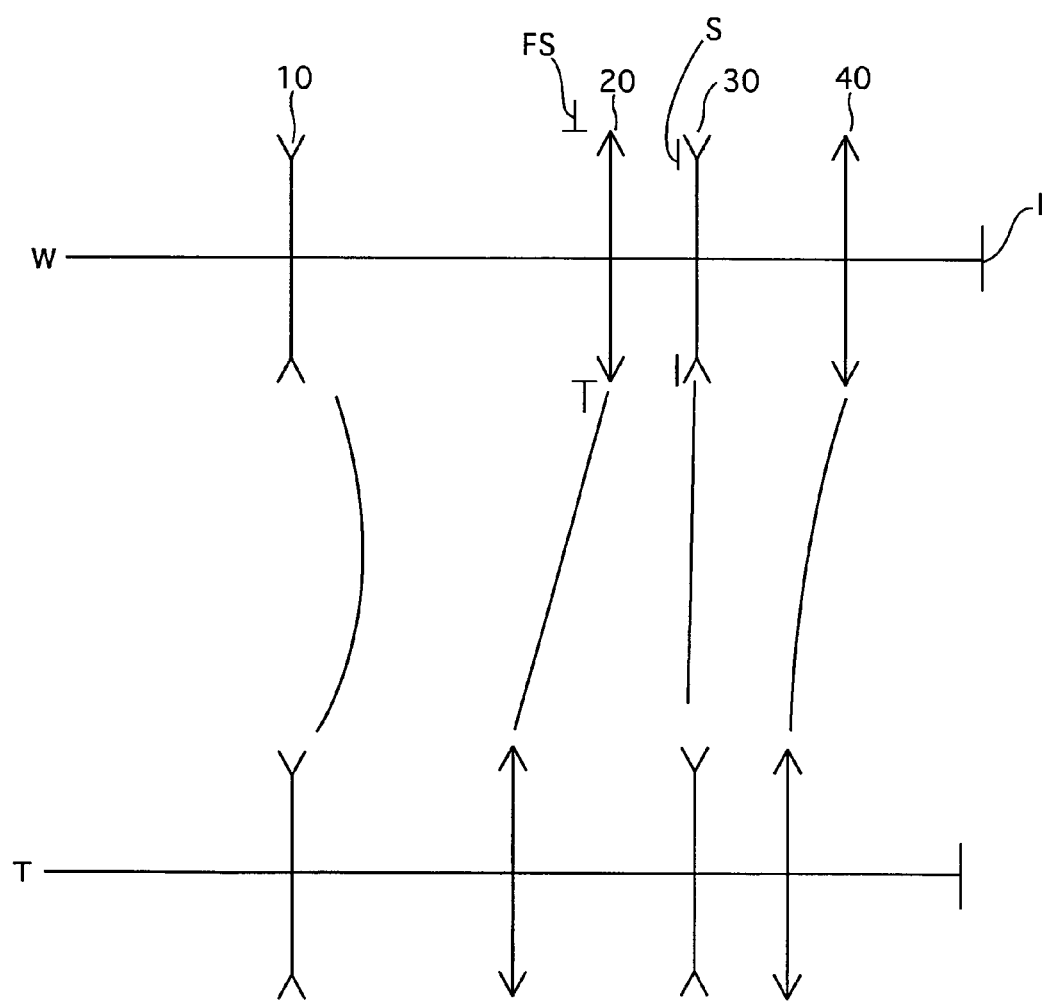
FIG. 37 is the schematic view of the lens-group moving paths for the zoom lens system according to the present invention.

As shown in the lens-group moving paths of FIG. 37, the zoom lens system of the present invention includes a negative first lens group 10, a fixed-aperture diaphragm FS, a positive second lens group 20, a variable-aperture diaphragm S, a negative third lens group 30, and a positive fourth lens group 40, in this order from the object.

Upon zooming from the short focal length extremity (W) to the long focal length extremity (T), the negative first lens group 10 first moves toward the image and thereafter moves toward the object (a U-turn path); and the positive second lens group 20, the negative third lens group 30 and the positive fourth lens group 40 respectively move monotonically toward the object.

The distance between the negative first lens group 10 and the positive second lens group 20 largely decreases at first, and gradually decreases thereafter.

The distance between the positive second lens group 20 and the negative third lens group 30 increases monotonically.

The distance between the negative third lens group 30 and the positive fourth lens group 40 decreases monotonically.

The distance between the positive fourth lens group 40 and the image plane increases monotonically.

The variable-aperture diaphragm S moves together with the negative third lens group 30; and focusing is carried out by the negative first lens group 10.

Important features of the present invention particularly reside in the structure of the negative third lens group 30 and that of the positive fourth lens group 40 in the zoom lens system of the four-lens-group arrangement.

As shown in FIGS. 1, 5, 9, 13, 17, 21, 25, 29 and 33, the negative third lens group 30 includes cemented lens elements having a positive lens element 31 and a negative lens element 32; and the positive fourth lens group 40 includes a positive single lens element 41, and cemented lens elements having a positive lens element 42 and a negative lens element 43.

By forming the negative third lens group 30 as the cemented lens elements having the positive lens element 31 and the negative lens element 32, a lower production cost of the zoom lens system and a lighter weight thereof can be achieved.

The positive lens element 31 and the negative lens element 32 of the negative third lens group 30 can be arranged in any order from the object.

In the negative fourth lens group 40, the order of the positive lens elements and the negative lens element is preferably "the positive lens element 41, the positive lens element 42 and the negative lens element 43", in this order from the object.

In the case where the negative lens element 43 is arranged to be the second (center) lens element of the positive fourth lens group 40, the negative lens element 43 largely refracts the light rays, so that aberrations of higher order tend to occur. Furthermore, aberration fluctuations upon zooming occur, and the change in field curvature becomes particularly larger.

Due to the above reasons, in the positive fourth lens group 40, the cemented lens elements is arranged to include the positive lens element 42 and the negative lens element 43, in this order from the object; and by cementing these lens elements, aberrations of higher order can be reduced.

Moreover, it is preferable that the cemented lens elements as a whole have a positive refractive power. By this arrangement, the occurrence of aberrations in the positive lens element can be reduced by the positive cemented lens elements in which the correcting of aberrations has been sufficiently made.

On the other hand, if the cemented lens elements as a whole have a negative refractive power, larger aberrations occurred in both the cemented lens elements and the positive lens element have to be corrected by these cemented lens elements and the positive lens element. Accordingly, the negative cemented lens elements are not desirable.

In the positive fourth lens group 40, the final lens element (the most image-side lens element) 43, i.e., the final lens element of the zoom lens system, is a negative lens element. In the case where the final (negative) lens element 43 is formed as a negative meniscus lens element, the correcting of field curvature can be advantageously performed.

Condition (1) specifies the refractive power of the negative third lens group 30.

If $|fi(i=3)|/fw$ exceeds the upper limit of condition (1), the negative refractive power of the negative third lens group 30 becomes insufficient. Accordingly, if an attempt is made to secure a longer back focal distance at the short focal length extremity, a strong divergent surface needs to be provided in the positive second lens group 20. Consequently, the correcting of aberration fluctuations becomes difficult when the positive second lens group 20 is being moved.

If $|fi(i=3)|/fw$ exceeds the lower limit of condition (1), the negative refractive power of the negative third lens group 30 becomes too strong. It becomes difficult to correct aberration fluctuations when the negative third lens group 30 is being moved unless the number of lens elements of the negative third lens group 30 is increased.

It is more preferable that the negative third lens group 30 satisfy the following conditions (1') or (1"):

$$1.2 < |fi(i=3)|/fw < 2.0 \quad (1')$$

$$1.3 < |fi(i=3)|/fw < 2.0 \quad (1")$$

Condition (2) specifies the refractive power of the positive fourth lens group 40.

If $fi(i=4)/fw$ exceeds the upper limit of condition (2), the positive refractive power of the positive fourth lens group 40 becomes insufficient. Consequently, it becomes difficult to maintain a function of the positive fourth lens group 40 to correct off-axis aberration with respect to the bundle of light rays with a wider angle-of-view at the short focal length extremity.

If $fi(i=4)/fw$ exceeds the lower limit of condition (2), the positive refractive power of the positive fourth lens group 40 becomes too strong. Consequently, aberration fluctuations upon zooming become undesirably larger.

It is more preferable that the positive fourth lens group 40 satisfy the following conditions (2') or (2"):

$$1.6 < fi(i=4)/fw < 2.1 \quad (2')$$

$$1.5 < fi(i=4)/fw < 2.2 \quad (2")$$

Condition (3) is provided to correct aberrations while the back focal distance is secured. By satisfying this condition, in addition to securing the back focal distance, the correcting of aberrations can be performed even if the zoom lens system is miniaturized.

If $|fi(i=1)|/fBw$ exceeds the upper limit of condition (3), the most object-side surface of the positive second lens group 20 needs to be formed as a strong divergent surface in order to secure the longer back focal distance with respect to the relatively shorter focal length. Consequently, it becomes difficult to correct off-axis aberration in the vicinity of the short focal length extremity, and to correct axial aberration in the vicinity of the long focal length extremity.

If $|fi(i=1)|/fBw$ exceeds the upper limit of condition (3), off-axis aberration occurred in the negative first lens group 10 cannot be corrected by the subsequent lens groups.

Condition (4) specifies the ratio of the refractive power of the positive second lens group 20 to that of the positive fourth lens group 40.

If $fi(i=4)/fi(i=2)$ exceeds the upper limit of condition (4), the positive second lens group 20 is arranged to perform most of the zooming function of the zoom lens system. Accordingly, fluctuations in spherical aberration and coma upon zooming become larger.

If $fi(i=4)/fi(i=2)$ exceeds the lower limit of condition (4), the positive fourth lens group 40 is arranged to perform most of the zooming function of the zoom lens system. Accordingly, the effects on the correcting of both field curvature and astigmatism by the positive fourth lens group 40 become insufficient.

Condition (5) specifies the lens-group moving path (the U-turn path) of the negative first lens group 10.

If $|fi(i=1)|/(fw \times ft)^{1/2}$ exceeds either upper or lower limits of condition (5), the traveling distance of the negative first lens group 10 becomes longer upon zooming. Accordingly, the diameter of the negative first lens group 10 becomes larger, and the overall length thereof becomes longer.

Condition (6) specifies the refractive power of the negative first lens group 10.

If $|fi(i=1)|/fw$ exceeds the upper limit of condition (6), the negative refractive power of the negative first lens group 10 becomes too weak. The traveling distance of the negative first lens group 10 for focusing becomes longer, so that the diameter of the negative fist lens group 10 becomes larger, or, the amount of peripheral illumination is reduces when an object at a closer distance is in an in-focus state.

If $|fi(i=1)|/fw$ exceeds the lower limit of condition (6), the negative refractive power of the negative first lens group 10 becomes too strong. Consequently, it becomes difficult to suitably correct distortion and astigmatism.

Condition (7) specifies the refractive power of the positive second lens group 20.

If $fi(i=2)/fw$ exceeds the upper limit of condition (7), the positive refractive power of the positive second lens group 20 becomes too weak. The traveling distance of the positive second lens group 20 for zooming becomes longer, so that the overall length of the zoom lens system becomes longer.

If $fi(i=2)/fw$ exceeds the lower limit of condition (7), the positive refractive power of the positive second lens group 20 becomes too strong. Consequently, the fluctuation of spherical aberration and that of coma upon zooming undesirably become larger.

In the zoom lens system of the present invention, the fixed-aperture diaphragm FS which restricts the off-axis light bundle at the short focal length extremity is provided in the close vicinity of the most object-side lens element of the positive second lens group 20.

Due to this arrangement of the fixed-aperture diaphragm FS, (i) the correcting of off-axis aberrations at the short focal length extremity becomes easier, (ii) a decrease of peripheral illumination upon focusing can be prevented even in the case where the negative first lens group 10 is arranged to be a focusing lens group, and (iii) it is advantageous to make the diameter of the negative first lens group 10 smaller.

The variable-aperture diaphragm S is provided between the positive second lens group 20 and the negative third lens group 30, both of which are ones of the lens groups constituting the four-lens-group arrangement, i.e., the negative lens group, the positive lens group, the negative lens group and the positive lens group. Due to this arrangement of the variable-aperture diaphragm S, fluctuations of coma, according to an aperture value, can be reduced to a minimum.

By providing an aspherical surface in the negative first lens group 10, distortion and astigmatism at the short focal length extremity in particular can be adequately corrected, and fluctuations of field curvature upon zooming can be reduced.

Specific numerical data of the embodiments will be described hereinafter.

In the diagrams of spherical aberration and the sine condition, the solid line SA designates spherical aberration, and the dotted line SC designates the sine condition.

In the diagrams of chromatic aberration (axial chromatic aberration) represented by spherical aberration, the solid line and the two types of dotted lines respectively designate spherical aberrations with respect to the d, g and C lines.

In the diagrams of lateral chromatic aberration, the two types of dotted lines respectively designate magnification with respect to the g and C lines; however, the d line as the base line coincides with the ordinate.

In the diagrams of astigmatism, S designates the sagittal image, and M designates the meridional image.

In the tables, $F_{NO.}$ designates the f-number, f designates the focal length of the zoom lens system, W designates the half angle-of-view (°), fB designates the back focal distance, r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x = cy^2/(1 + [1 - \{1+K\}c^2y^2]^{1/2}) + A4y^4 + A6y^6 + A8y^8 + A10y^{10}$$

wherein:
  c designates a curvature of the aspherical vertex (1/r);
  y designates a distance from the optical axis;
  K designates the conic coefficient; and
  A4 designates a fourth-order aspherical coefficient;
  A6 designates a sixth-order aspherical coefficient;
  A8 designates a eighth-order aspherical coefficient; and
  A10 designates a tenth-order aspherical coefficient.

Embodiment 1

Figure 1:
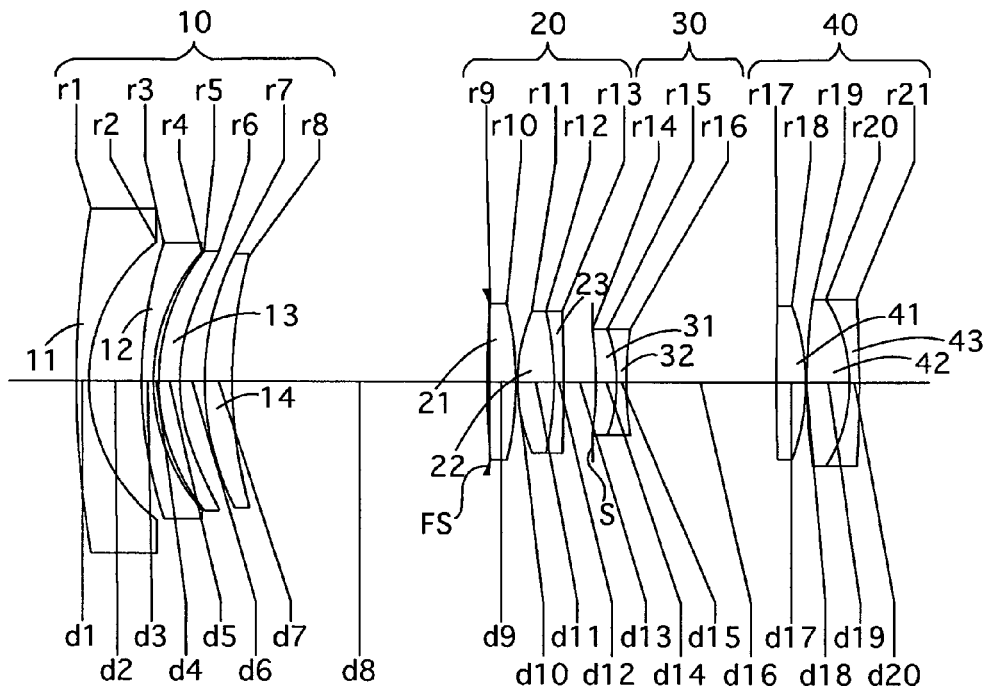
FIG. 1 is a lens arrangement of the zoom lens system at the short focal length extremity, according to a first embodiment of the present invention.
Figures 2A, 2B, 2C, 2D, 2E:
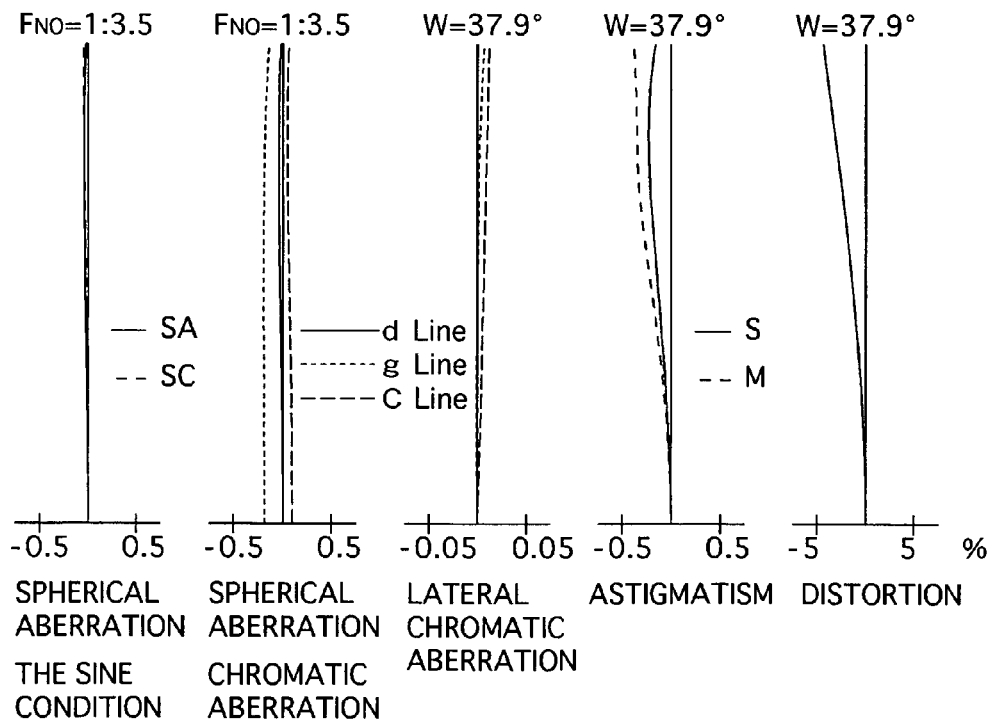
FIGS. 2A, 2B, 2C, 2D and 2E show aberrations occurred in the lens arrangement shown in FIG. 1.

FIG. 1 is the lens arrangement of the zoom lens system at the short focal length extremity, according to the first embodiment of the present invention. FIGS. 2A through 2E show aberrations occurred in the lens arrangement shown in FIG. 1. FIG. 3 is the lens arrangement of the zoom lens system at the long focal length extremity, according to the first embodiment of the present invention. FIGS. 4A through 4E show aberrations occurred in the lens arrangement shown in FIG. 3. Table 1 shows the numerical values of the first embodiment.

The negative first lens group 10 includes a negative meniscus lens element 11, a negative meniscus lens element 12, a negative meniscus lens element 13 with a weaker negative refractive power, and a positive meniscus lens element 14, in this order from the object side. Each of the meniscus lens elements (11, 12, 13 and 14) has the convex surface facing toward the object.

The positive second lens group 20 includes a biconvex positive lens element 21, the cemented lens elements having a biconvex positive lens element 22 and a negative meniscus lens element 23, in this order from the object.

The negative third lens group 30 includes the cemented lens elements having a positive meniscus lens element 31 having the convex surface facing toward the image and a biconcave negative lens element 32, in this order from the object.

The positive fourth lens group 40 includes a biconvex positive lens element 41, and the cemented lens elements having a biconvex positive lens element 42 and a negative meniscus lens element 43 having the convex surface facing toward the image, in this order from the object.

The fixed-aperture diaphragm FS is provided 0.3 before the most object-side surface (surface No. 9) of the positive second lens group 20; and the variable-aperture diaphragm S is provided 0.36 before the most object-side surface (surface No. 14) of the negative third lens group 30.

TABLE 1

$F_{NO.} = 1:3.5-5.7$
$f = 19.10-55.16$
$W = 37.9-14.3$
$fB = 37.71-58.13$

| Surf. No. | r | d | Nd | v |
|---|---|---|---|---|
| 1 | 106.359 | 1.30 | 1.60311 | 60.7 |
| 2 | 18.599 | 5.46 | — | — |
| 3 | 46.313 | 1.20 | 1.62299 | 58.2 |
| 4 | 20.485 | 0.55 | — | — |
| 5 | 21.692 | 2.20 | 1.52538 | 56.3 |
| 6* | 19.048 | 2.60 | — | — |
| 7 | 30.674 | 2.75 | 1.84666 | 23.8 |
| 8 | 49.739 | 26.08-3.00 | — | — |
| 9 | 86.921 | 3.01 | 1.51601 | 49.9 |
| 10 | −36.585 | 0.20 | — | — |
| 11 | 19.624 | 3.72 | 1.48749 | 70.2 |
| 12 | −32.878 | 1.00 | 1.84333 | 24.2 |
| 13 | −176.955 | 3.36-16.26 | — | — |
| 14 | −42.791 | 2.13 | 1.84700 | 24.0 |
| 15 | −16.494 | 1.00 | 1.77249 | 49.4 |
| 16 | 37.235 | 15.40-2.50 | — | — |
| 17 | 268.822 | 3.03 | 1.64118 | 58.9 |
| 18 | −23.286 | 0.10 | — | — |
| 19 | 59.669 | 4.46 | 1.51601 | 50.6 |
| 20 | −16.653 | 1.00 | 1.75589 | 28.8 |
| 21 | −129.497 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 | A10 |
|---|---|---|---|---|
| 6 | $-0.32236 \times 10^{-4}$ | $-0.71389 \times 10^{-7}$ | $0.88889 \times 10^{-10}$ | $-0.72416 \times 10^{-12}$ |

Embodiment 2

Figure 5:
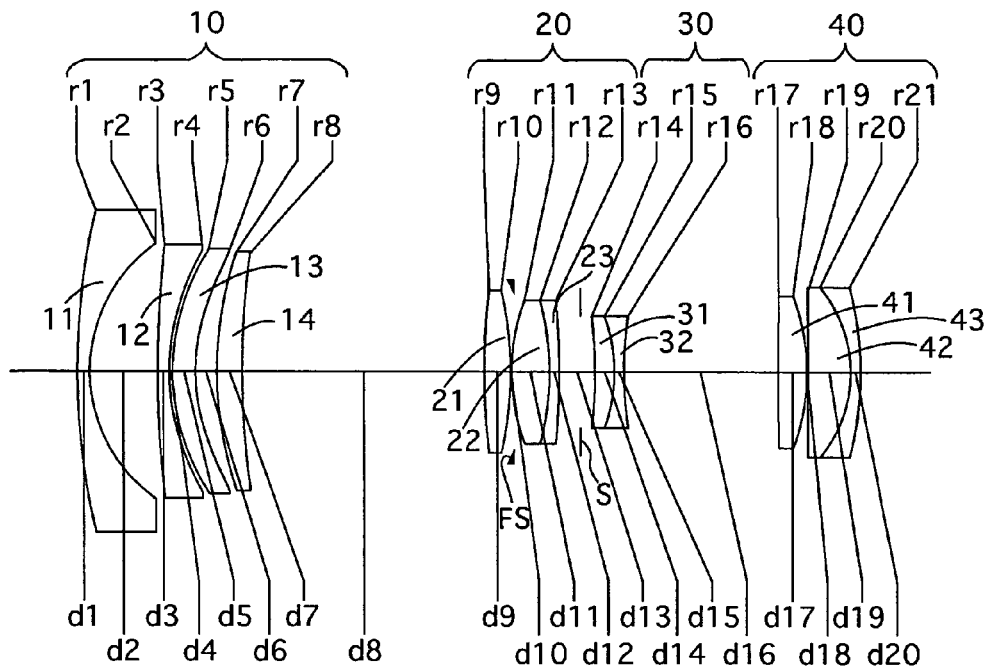
FIG. 5 is a lens arrangement of the zoom lens system at the short focal length extremity, according to a second embodiment of the present invention.
Figures 6A, 6B, 6C, 6D, 6E:
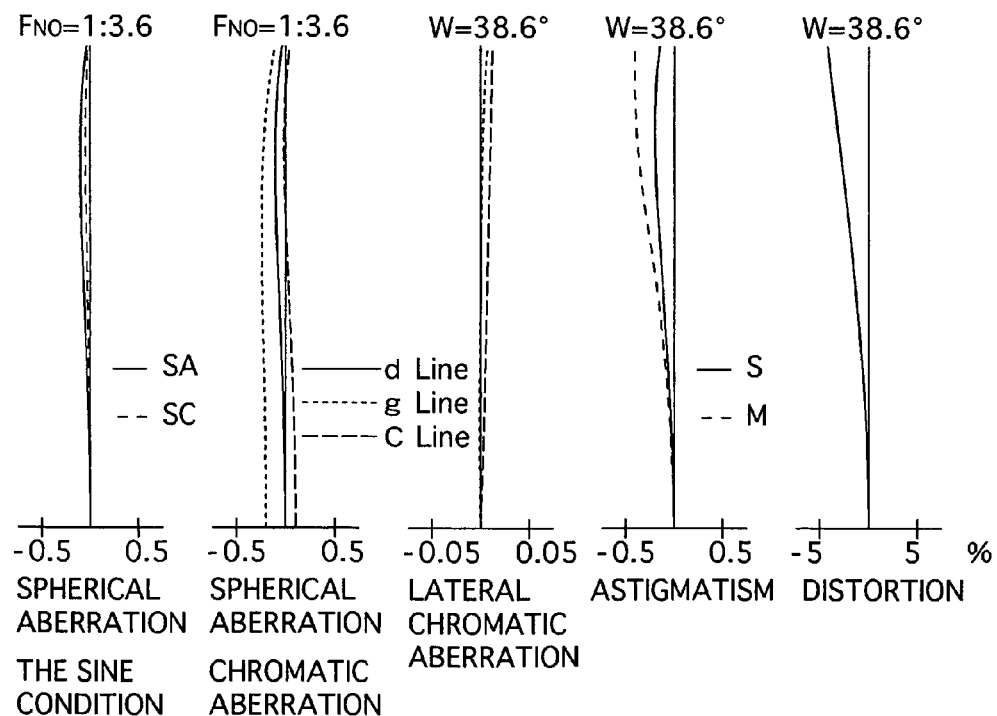
FIGS. 6A, 6B, 6C, 6D and 6E show aberrations occurred in the lens arrangement shown in FIG. 5.
Figure 7:
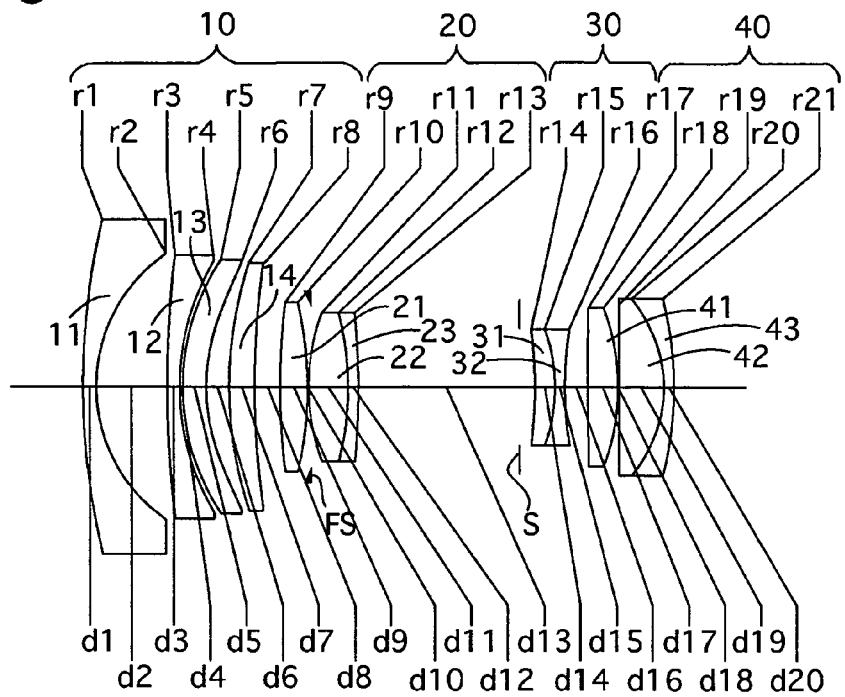
FIG. 7 is a lens arrangement of the zoom lens system at the long focal length extremity, according to the second embodiment of the present invention.
Figures 8A, 8B, 8C, 8D, 8E:
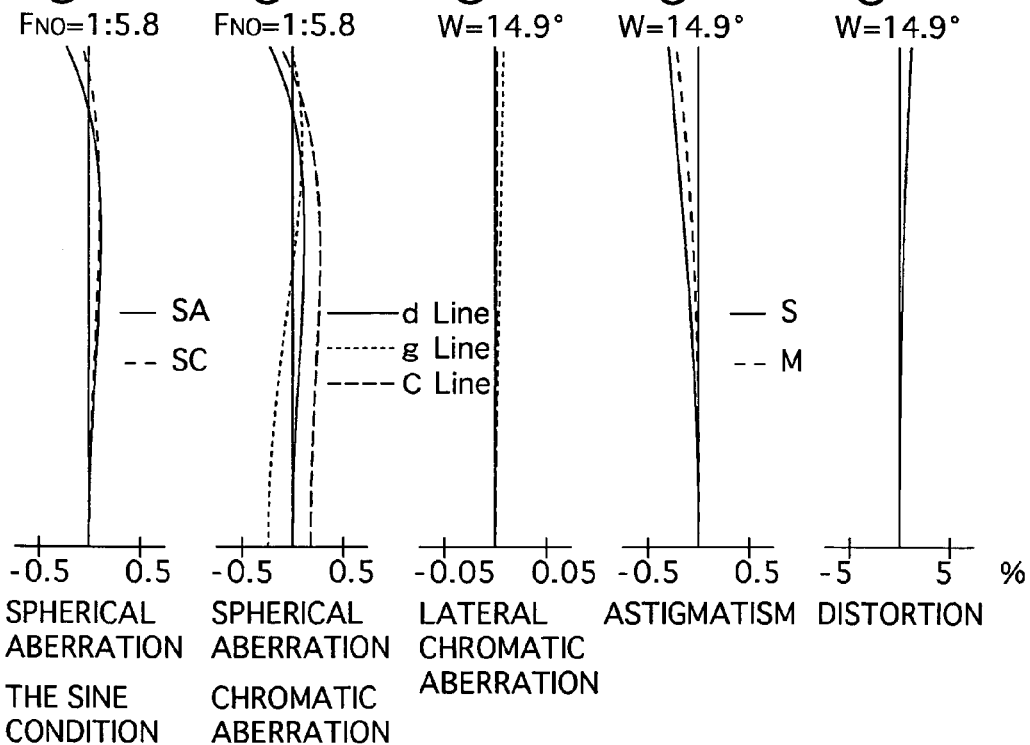
FIGS. 8A, 8B, 8C, 8D and 8E show aberrations occurred in the lens arrangement shown in FIG. 7.

FIG. 5 is the lens arrangement of the zoom lens system at the short focal length extremity, according to the second embodiment of the present invention. FIGS. 6A through 6E show aberrations occurred in the lens arrangement shown in FIG. 5. FIG. 7 is the lens arrangement of the zoom lens system at the long focal length extremity, according to the second embodiment of the present invention. FIGS. 8A through 8E show aberrations occurred in the lens arrangement shown in FIG. 7. Table 2 shows the numerical values of the second embodiment.

The basic lens arrangement of the second embodiment is the same as that of the first embodiment except the position of the fixed-aperture diaphragm FS.

The fixed-aperture diaphragm FS is provided 0.4 behind the image-side surface (surface No. 10) of the biconvex positive lens element 21 of the positive second lens group 20; and the variable-aperture diaphragm S is provided 1.50 before the most object-side surface (surface No. 14) of the negative third lens group 30.

TABLE 2

$F_{NO.} = 1: 3.6-5.8$
$f = 18.60-53.00$
$W = 38.6-14.9$
$fB = 37.90-60.18$

| Surf.No. | r | d | Nd | ν |
|---|---|---|---|---|
| 1 | 72.611 | 1.30 | 1.62300 | 58.2 |
| 2 | 16.331 | 7.01 | — | — |
| 3 | 119.365 | 1.20 | 1.60300 | 60.7 |
| 4 | 25.068 | 0.30 | — | — |
| 5 | 23.336 | 2.30 | 1.52538 | 56.3 |
| 6* | 18.769 | 2.24 | — | — |
| 7 | 39.265 | 2.55 | 1.84666 | 23.8 |
| 8 | 90.974 | 24.78-2.50 | — | — |
| 9 | 72.321 | 2.71 | 1.51623 | 56.5 |
| 10 | −37.866 | 0.10 | — | — |
| 11 | 21.414 | 3.91 | 1.48749 | 70.2 |
| 12 | −29.874 | 1.00 | 1.84666 | 23.8 |
| 13 | −82.049 | 3.70-17.32 | — | — |
| 14 | −46.261 | 2.00 | 1.84666 | 23.8 |
| 15 | −16.959 | 1.00 | 1.76806 | 47.6 |
| 16 | 40.038 | 15.82-2.20 | — | — |
| 17 | 344.671 | 3.00 | 1.52001 | 56.8 |
| 18 | −22.902 | 0.10 | — | — |
| 19 | −1211.995 | 4.39 | 1.54460 | 45.2 |
| 20 | −14.008 | 1.00 | 1.80518 | 25.4 |
| 21 | −36.013 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 | A10 |
|---|---|---|---|---|
| 6 | $-0.38613 \times 10^{-4}$ | $-0.69243 \times 10^{-7}$ | $0.78849 \times 10^{-10}$ | $-0.71375 \times 10^{-12}$ |

Embodiment 3

Figure 9:
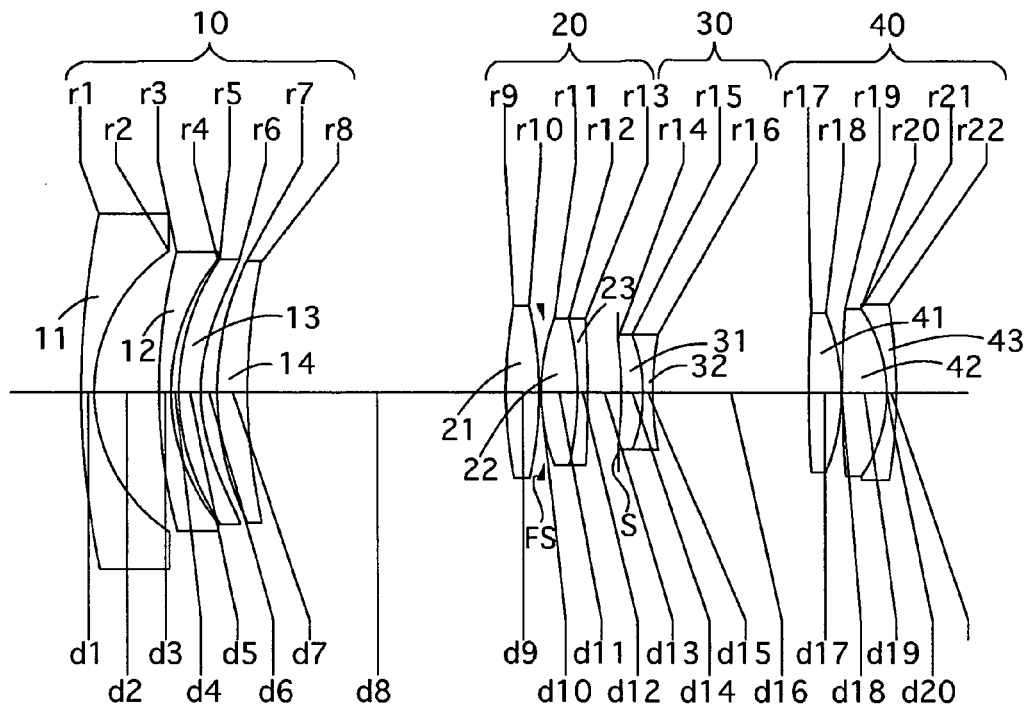
FIG. 9 is a lens arrangement of the zoom lens system at the short focal length extremity, according to a third embodiment of the present invention.
Figures 10A, 10B, 10C, 10D, 10E:
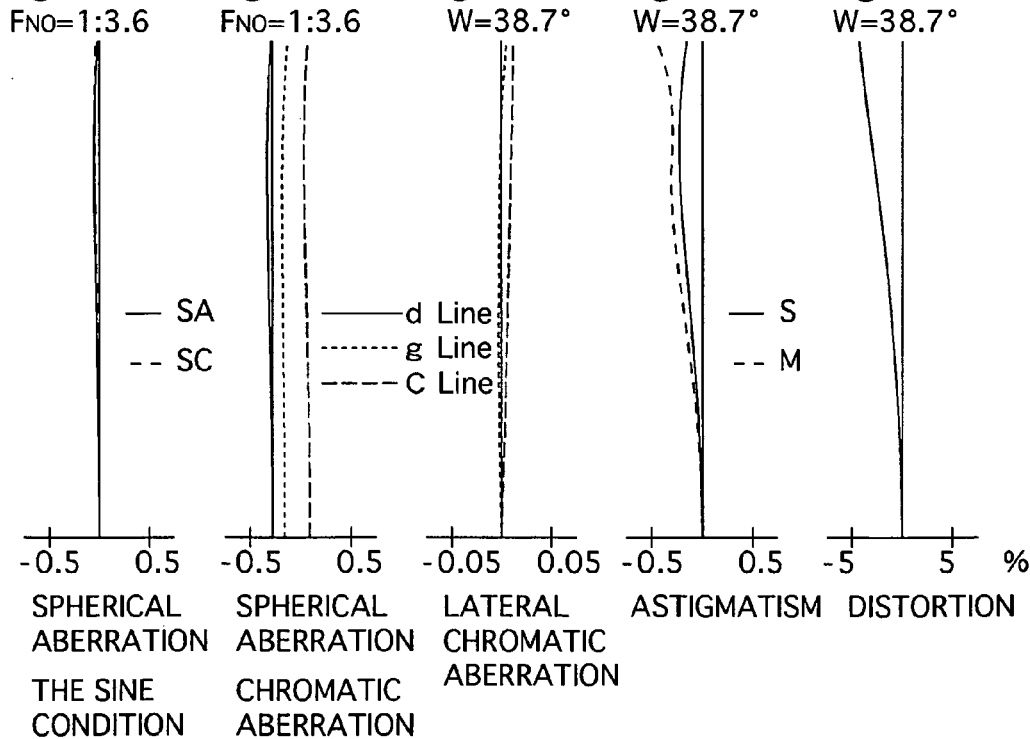
FIGS. 10A, 10B, 10C, 10D and 10E show aberrations occurred in the lens arrangement shown in FIG. 9.
Figure 11:
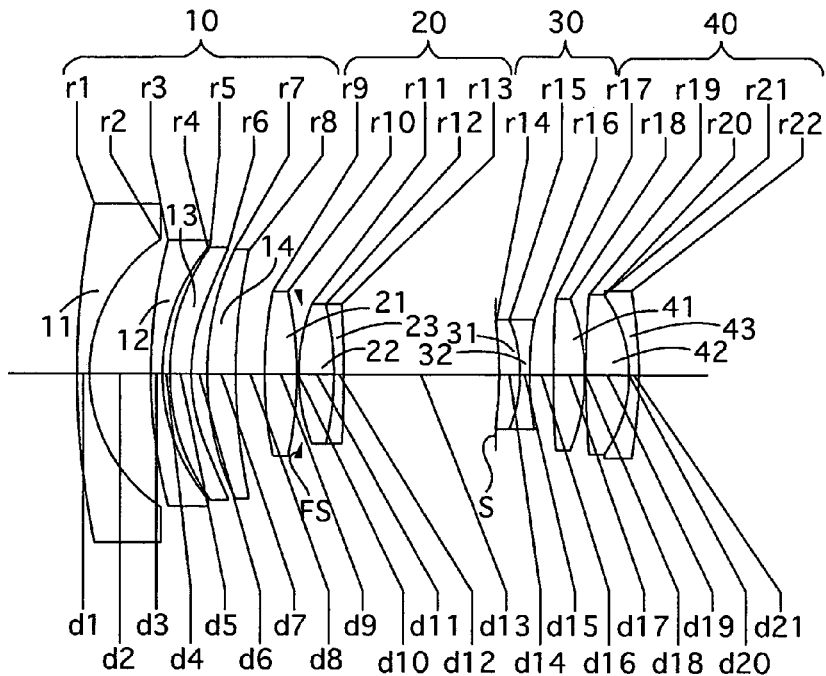
FIG. 11 is a lens arrangement of the zoom lens system at the long focal length extremity, according to the third embodiment of the present invention.
Figures 12A, 12B, 12C, 12D, 12E:
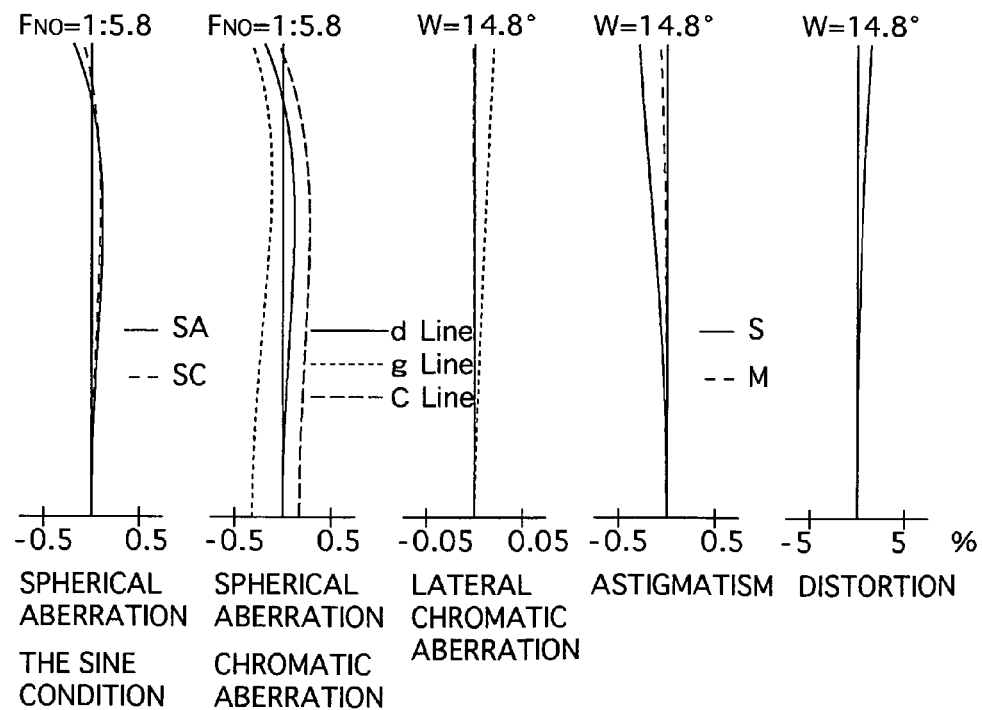
FIGS. 12A, 12B, 12C, 12D and 12E show aberrations occurred in the lens arrangement shown in FIG. 11.

FIG. 9 is the lens arrangement of the zoom lens system at the short focal length extremity, according to the third embodiment of the present invention. FIGS. 10A through 10E show aberrations occurred in the lens arrangement shown in FIG. 9. FIG. 11 is the lens arrangement of the zoom lens system at the long focal length extremity, according to the third embodiment of the present invention. FIGS. 12A through 12E show aberrations occurred in the lens arrangement shown in FIG. 11. Table 3 shows the numerical values of the third embodiment.

The basic lens arrangement and the positions of the diaphragms of the third embodiment are the same as those of the second embodiment.

The fixed-aperture diaphragm FS is provided 0.5 behind the image-side surface (surface No. 10) of the biconvex positive lens element 21 of the positive second lens group 20; and the variable-aperture diaphragm S is provided 0.35 before the most object-side surface (surface No. 14) of the negative third lens group 30.

TABLE 3

$F_{NO.} = 1: 3.6-5.8$
$f = 18.60-53.00$
$W = 38.7-14.8$
$fB = 37.25-54.91$

| Surf.No. | r | d | Nd | ν |
|---|---|---|---|---|
| 1 | 88.473 | 1.30 | 1.60311 | 60.7 |
| 2 | 17.190 | 6.47 | — | — |
| 3 | 56.090 | 1.20 | 1.62300 | 61.9 |
| 4 | 21.192 | 0.79 | — | — |
| 5 | 23.711 | 2.20 | 1.52538 | 56.3 |
| 6* | 18.634 | 1.64 | — | — |
| 7 | 31.444 | 2.97 | 1.84666 | 23.8 |
| 8 | 63.167 | 25.67-3.00 | — | — |
| 9 | 46.760 | 3.36 | 1.51600 | 65.1 |
| 10 | −39.655 | 0.20 | — | — |
| 11 | 21.204 | 3.66 | 1.48749 | 70.2 |
| 12 | −32.029 | 1.00 | 1.84240 | 24.3 |
| 13 | −126.827 | 3.35-16.25 | — | — |
| 14 | −43.417 | 2.16 | 1.84699 | 24.0 |
| 15 | −15.965 | 1.00 | 1.77249 | 48.0 |
| 16 | 32.146 | 15.40-2.50 | — | — |
| 17 | 129.034 | 3.25 | 1.52000 | 57.5 |
| 18 | −21.958 | 0.10 | — | — |
| 19 | 111.780 | 4.45 | 1.51600 | 50.6 |
| 20 | −15.389 | 1.00 | 1.76456 | 28.2 |
| 21 | −53.155 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 | A10 |
|---|---|---|---|---|
| 6 | $-0.38574 \times 10^{-4}$ | $-0.88257 \times 10^{-7}$ | $0.16371 \times 10^{-9}$ | $-0.11929 \times 10^{-11}$ |

Embodiment 4

Figure 13:
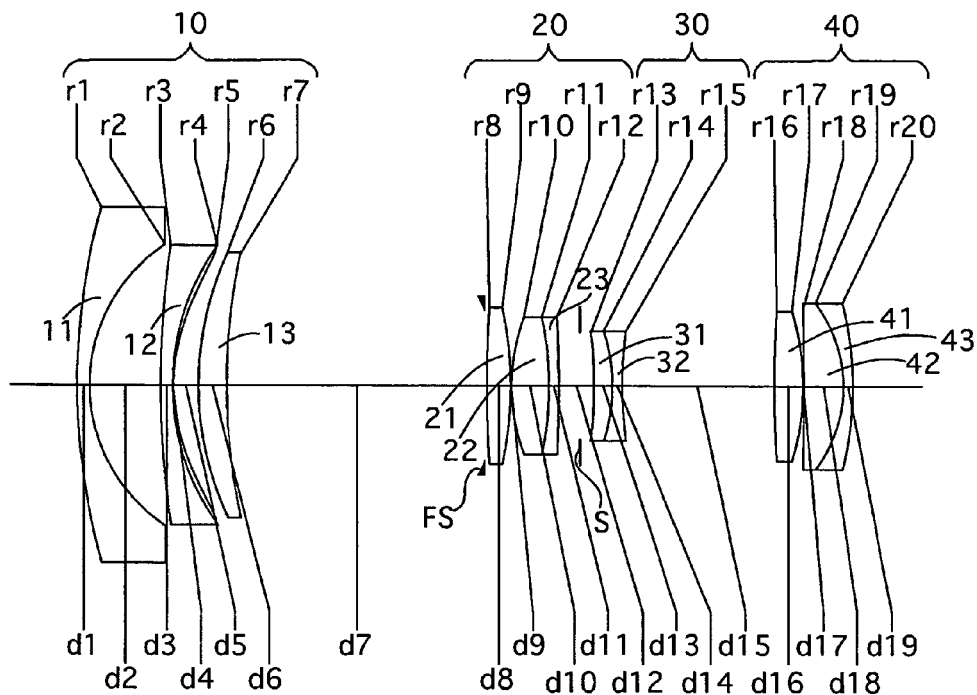
FIG. 13 is a lens arrangement of the zoom lens system at the short focal length extremity, according to a fourth embodiment of the present invention.
Figures 14A, 14B, 14C, 14D, 14E:
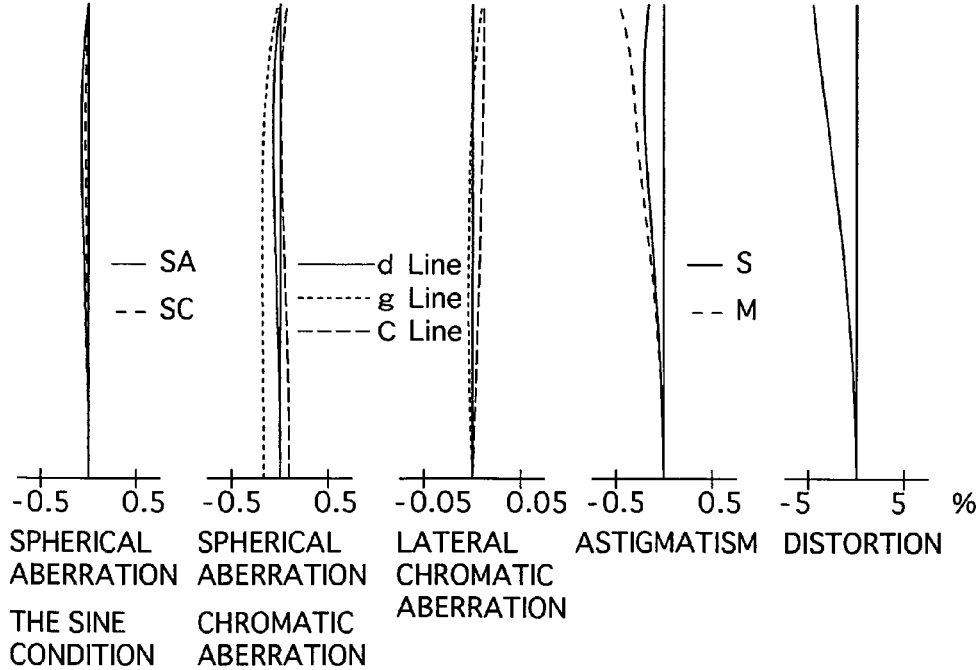
FIGS. 14A, 14B, 14C, 14D and 14E show aberrations occurred in the lens arrangement shown in FIG. 13.

FIG. 13 is the lens arrangement of the zoom lens system at the short focal length extremity, according to the fourth embodiment of the present invention. FIGS. 14A through 14E show aberrations occurred in the lens arrangement shown in FIG. 13. FIG. 15 is the lens arrangement of the zoom lens system at the long focal length extremity, according to the fourth embodiment of the present invention. FIGS. 16A through 16E show aberrations occurred in the lens arrangement shown in FIG. 15. Table 4 shows the numerical values of the fourth embodiment.

In the fourth embodiment, the negative first lens group 10 includes a negative meniscus lens element 11, a negative meniscus lens element 12 and a positive meniscus lens element 13, in this order from the object. Each of these meniscus lens elements (11, 12 and 13) has the convex surface facing toward the object.

On the image-side surface of the negative meniscus lens element 12, an aspherical surface layer made from a synthetic resin material is cemented, i.e., the negative meniscus lens element 12 is a hybrid aspherical lens element.

The remaining lens arrangement and the positions of the diaphragms of the fourth embodiment are the same as those of the first embodiment.

The fixed-aperture diaphragm FS is provided 0.2 before the most object-side surface (surface No. 8) of the positive second lens group 20; and the variable-aperture diaphragm S is provided 1.50 before the most object-side surface (surface No. 13) of the negative third lens group 30.

TABLE 4

$F_{NO.} = 1: 3.6$-$5.8$
$f = 18.51$-$53.00$
$W = 38.8$-$15.0$
$fB = 37.50$-$62.02$

| Surf.No. | r | d | Nd | ν |
|---|---|---|---|---|
| 1 | 69.727 | 1.30 | 1.62299 | 58.2 |
| 2 | 17.884 | 7.46 | — | — |
| 3 | 104.755 | 1.20 | 1.60299 | 60.9 |
| 4 | 25.338 | 0.10 | 1.52972 | 42.7 |
| 5* | 19.182 | 2.59 | — | — |
| 6 | 32.938 | 2.99 | 1.84666 | 23.8 |
| 7 | 66.736 | 27.02-2.50 | — | — |
| 8 | 125.947 | 2.46 | 1.51684 | 54.1 |
| 9 | −39.412 | 0.10 | — | — |
| 10 | 20.513 | 3.93 | 1.48749 | 70.2 |
| 11 | −35.399 | 1.00 | 1.84666 | 23.8 |
| 12 | −143.655 | 3.70-17.32 | — | — |
| 13 | −46.381 | 1.94 | 1.84666 | 23.8 |
| 14 | −18.830 | 1.00 | 1.72948 | 49.8 |
| 15 | 43.359 | 15.82-2.20 | — | — |
| 16 | 122.197 | 2.92 | 1.60247 | 56.3 |
| 17 | −28.613 | 0.10 | — | — |
| 18 | −336.460 | 4.16 | 1.53561 | 46.0 |
| 19 | −14.500 | 1.00 | 1.80518 | 25.4 |
| 20 | −35.223 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 | A10 |
|---|---|---|---|---|
| 5 | $-0.29779 \times 10^{-4}$ | $-0.60837 \times 10^{-7}$ | $0.74868 \times 10^{-10}$ | $-0.59300 \times 10^{-12}$ |

Embodiment 5

Figure 17:
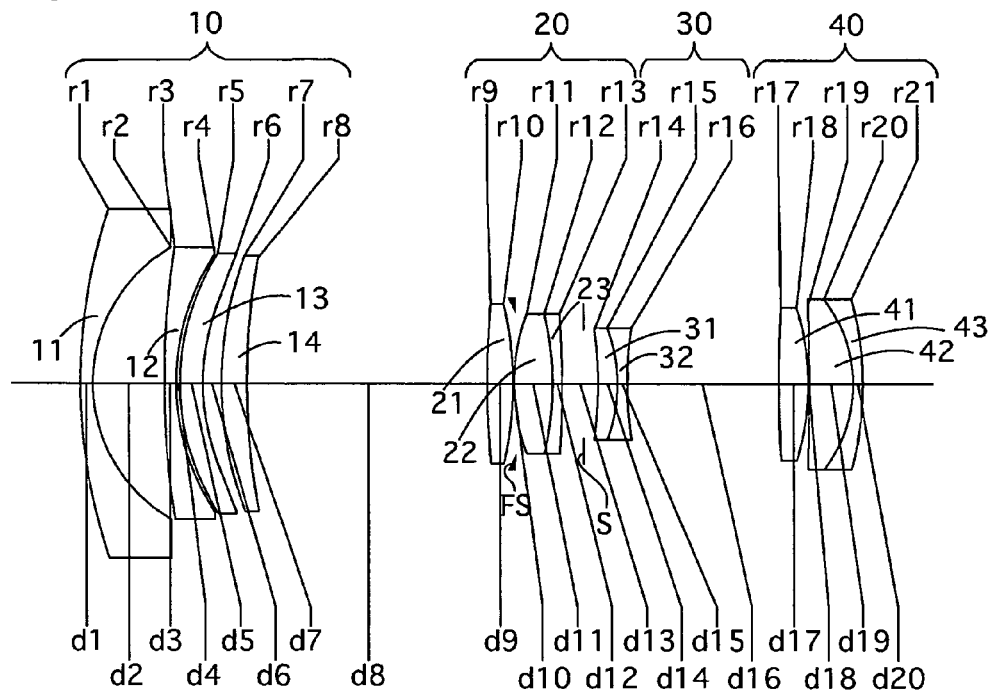
FIG. 17 is a lens arrangement of the zoom lens system at the short focal length extremity, according to a fifth embodiment of the present invention.
Figures 18A, 18B, 18C, 18D, 18E:
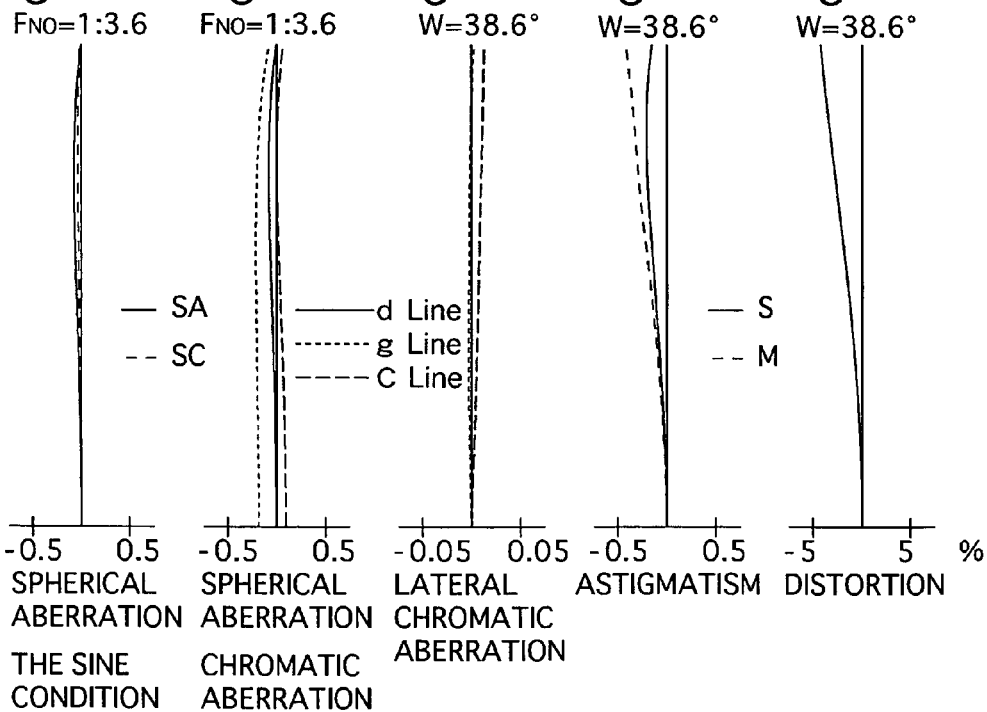
FIGS. 18A, 18B, 18C, 18D and 18E show aberrations occurred in the lens arrangement shown in FIG. 17.
Figure 19:
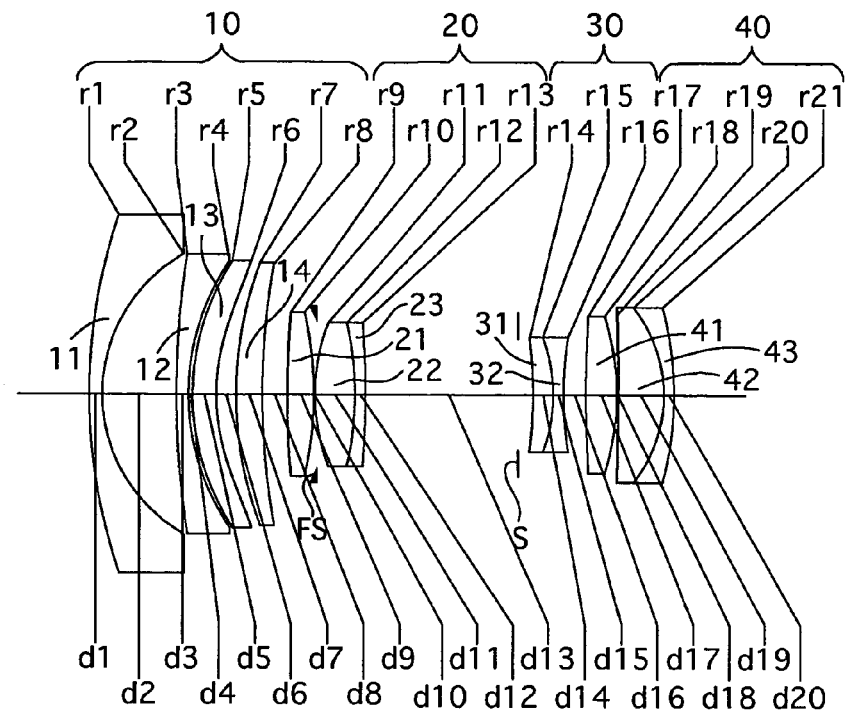
FIG. 19 is a lens arrangement of the zoom lens system at the long focal length extremity, according to the fifth embodiment of the present invention.
Figures 20A, 20B, 20C, 20D, 20E:
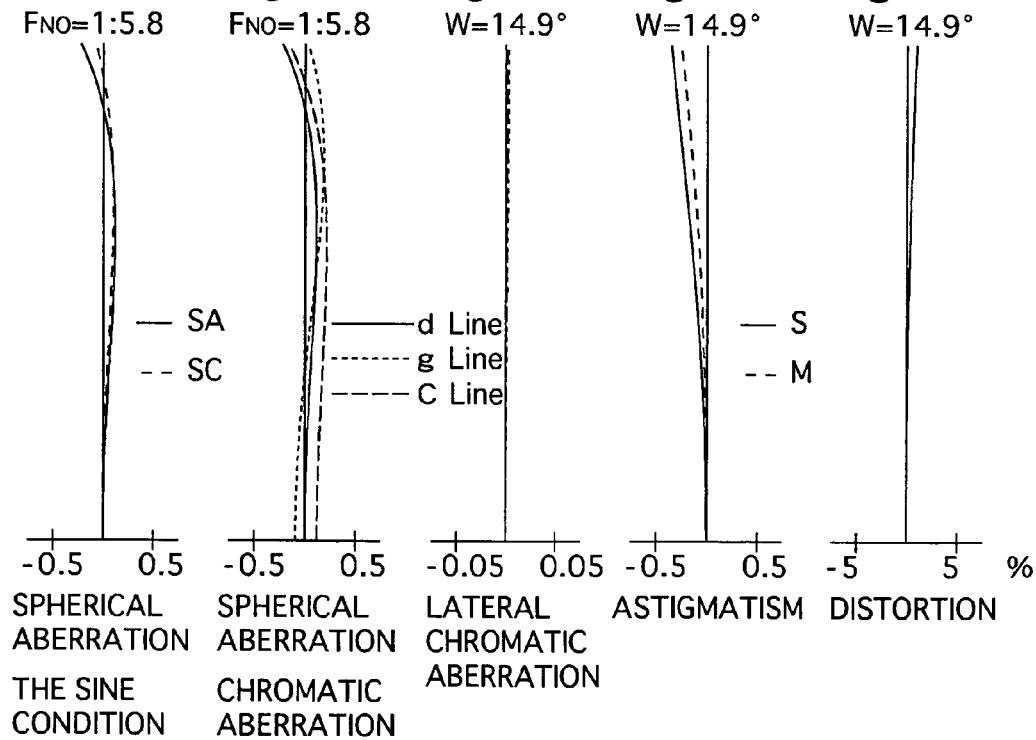
FIGS. 20A, 20B, 20C, 20D and 20E show aberrations occurred in the lens arrangement shown in FIG. 19.

FIG. 17 is the lens arrangement of the zoom lens system at the short focal length extremity, according to the fifth embodiment of the present invention. FIGS. 18A through 18E show aberrations occurred in the lens arrangement shown in FIG. 17. FIG. 19 is the lens arrangement of the zoom lens system at the long focal length extremity, according to the fifth embodiment of the present invention. FIGS. 20A through 20E show aberrations occurred in the lens arrangement shown in FIG. 19. Table 5 shows the numerical values of the fifth embodiment.

The basic lens arrangement and the positions of the diaphragms of the fifth embodiment are the same as those of the second and third embodiments.

The fixed-aperture diaphragm FS is provided 0.3 behind the image-side surface (surface No. 10) of the biconvex positive lens element 21 of the positive second lens group 20; and the variable-aperture diaphragm S is provided 1.50 before the most object-side surface (surface No. 14) of the negative third lens group 30.

TABLE 5

$F_{NO.} = 1: 3.6$-$5.8$
$f = 18.60$-$53.01$
$W = 38.6$-$14.9$
$fB = 38.10$-$60.24$

| Surf.No. | r | d | Nd | ν |
|---|---|---|---|---|
| 1 | 55.963 | 1.30 | 1.62299 | 58.2 |
| 2 | 16.390 | 7.41 | — | — |
| 3 | 92.662 | 1.20 | 1.62299 | 58.2 |
| 4 | 24.678 | 0.40 | — | — |
| 5 | 25.298 | 2.30 | 1.52538 | 56.3 |
| 6* | 20.768 | 1.95 | — | — |
| 7 | 38.025 | 2.60 | 1.84666 | 23.8 |
| 8 | 75.500 | 24.64-2.50 | — | — |
| 9 | 97.810 | 2.61 | 1.51742 | 52.4 |
| 10 | −37.630 | 0.10 | — | — |
| 11 | 20.500 | 3.92 | 1.48749 | 70.2 |
| 12 | −32.583 | 1.00 | 1.84666 | 23.8 |
| 13 | −102.000 | 3.70-16.90 | — | — |
| 14 | −40.700 | 2.01 | 1.84666 | 23.8 |
| 15 | −16.570 | 1.00 | 1.74320 | 49.3 |
| 16 | 38.493 | 15.40-2.20 | — | — |
| 17 | 136.445 | 3.02 | 1.60311 | 60.7 |
| 18 | −26.766 | 0.10 | — | — |
| 19 | −344.587 | 4.54 | 1.53172 | 48.9 |
| 20 | −14.548 | 1.00 | 1.80518 | 25.4 |
| 21 | −34.428 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 | A8 | A10 |
|---|---|---|---|---|
| 6 | $-0.32430 \times 10^{-4}$ | $-0.62540 \times 10^{-7}$ | $0.65180 \times 10^{-10}$ | $-0.61990 \times 10^{-12}$ |

Embodiment 6

Figures 21, 22A, 22B, 22C, 22D, 22E:
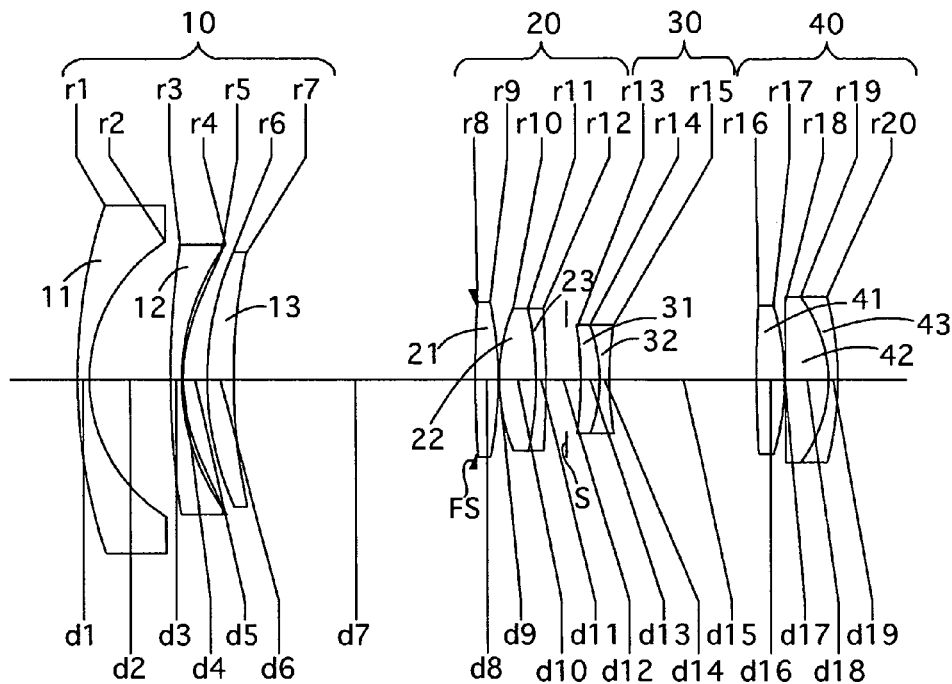
FIG. 21 is a lens arrangement of the zoom lens system at the short focal length extremity, according to a sixth embodiment of the present invention.
FIGS. 22A, 22B, 22C, 22D and 22E show aberrations occurred in the lens arrangement shown in FIG. 21.
Figure 23:
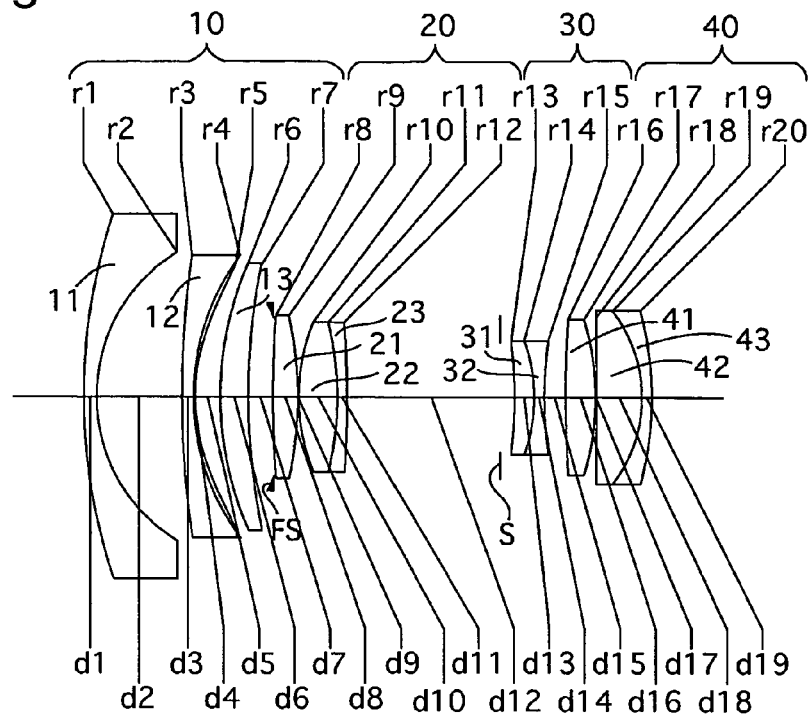
FIG. 23 is a lens arrangement of the zoom lens system at the long focal length extremity, according to the sixth embodiment of the present invention.
Figures 24A, 24B, 24C, 24D, 24E:
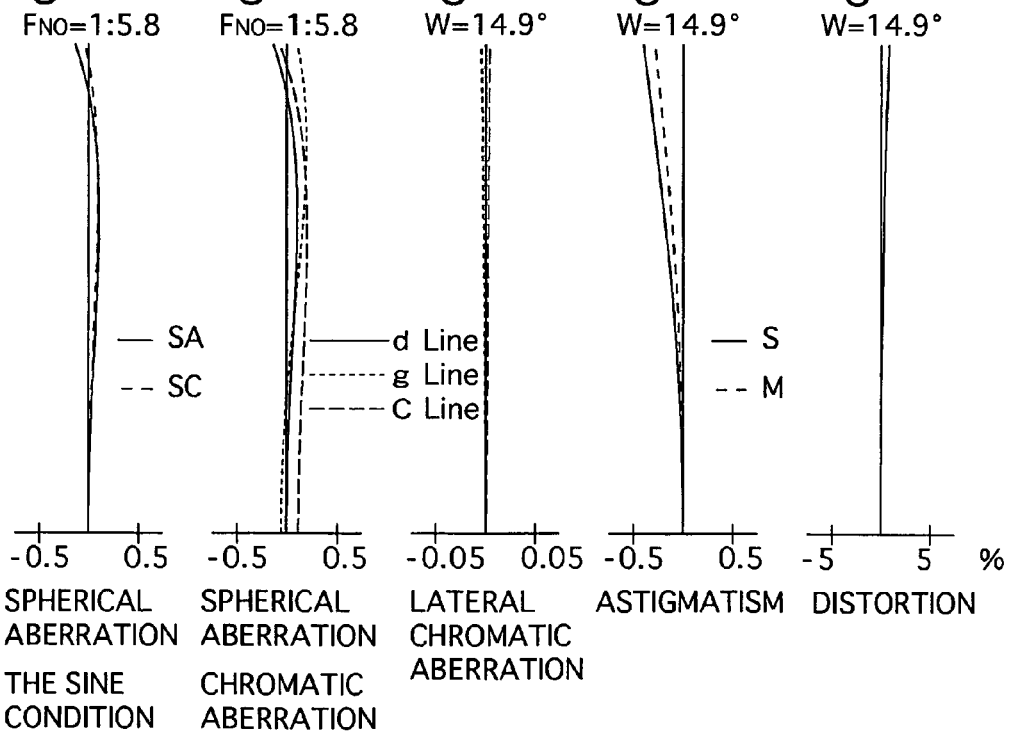
FIGS. 24A, 24B, 24C, 24D and 24E show aberrations occurred in the lens arrangement shown in FIG. 23.

FIG. 21 is the lens arrangement of the zoom lens system at the short focal length extremity, according to the sixth embodiment of the present invention. FIGS. 22A through 22E show aberrations occurred in the lens arrangement shown in FIG. 21. FIG. 23 is the lens arrangement of the zoom lens system at the long focal length extremity, according to the sixth embodiment of the present invention. FIGS. 24A through 24E show aberrations occurred in the lens arrangement shown in FIG. 23. Table 6 shows the numerical values of the sixth embodiment.

The basic lens arrangement and the positions of the diaphragms of the sixth embodiment are the same as those of the fourth embodiment.

The fixed-aperture diaphragm FS is provided 0.1 before the most object-side surface (surface No. 8) of the positive second lens group 20; and the variable-aperture diaphragm S is provided 1.50 before the most object-side surface (surface No. 13) of the negative third lens group 30.

TABLE 6

$F_{NO.} = 1: 3.6-5.8$
$f = 18.60-53.00$
$W = 38.6-14.9$
$fB = 38.14-61.04$

| Surf.No. | r | d | Nd | ν |
|---|---|---|---|---|
| 1 | 58.371 | 1.30 | 1.62299 | 58.2 |
| 2 | 17.392 | 8.63 | — | — |
| 3 | 95.918 | 1.20 | 1.62299 | 58.2 |
| 4 | 24.643 | 0.15 | 1.52972 | 42.7 |
| 5* | 19.324 | 2.50 | — | — |
| 6 | 34.368 | 2.79 | 1.84666 | 23.8 |
| 7 | 66.576 | 25.39-2.50 | — | — |
| 8 | 112.115 | 2.49 | 1.51742 | 52.4 |
| 9 | -39.999 | 0.10 | — | — |
| 10 | 20.290 | 3.90 | 1.48749 | 70.2 |
| 11 | -33.635 | 1.00 | 1.84666 | 23.8 |
| 12 | -109.808 | 3.70-16.90 | — | — |
| 13 | -43.692 | 2.00 | 1.84666 | 23.8 |
| 14 | -17.366 | 1.00 | 1.74320 | 49.3 |
| 15 | 39.082 | 15.40-2.20 | — | — |
| 16 | 128.598 | 2.96 | 1.60311 | 60.7 |
| 17 | -28.314 | 0.10 | — | — |
| 18 | -970.537 | 4.56 | 1.53172 | 48.9 |
| 19 | -14.777 | 1.00 | 1.80518 | 25.4 |
| 20 | -34.986 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 5 | $-0.31101 \times 10^{-4}$ | $-0.61203 \times 10^{-7}$ |

| Surf. No. | A8 | A10 |
|---|---|---|
| 5 | $0.50434 \times 10^{-10}$ | $-0.57061 \times 10^{-12}$ |

Embodiment 7

Figure 25:
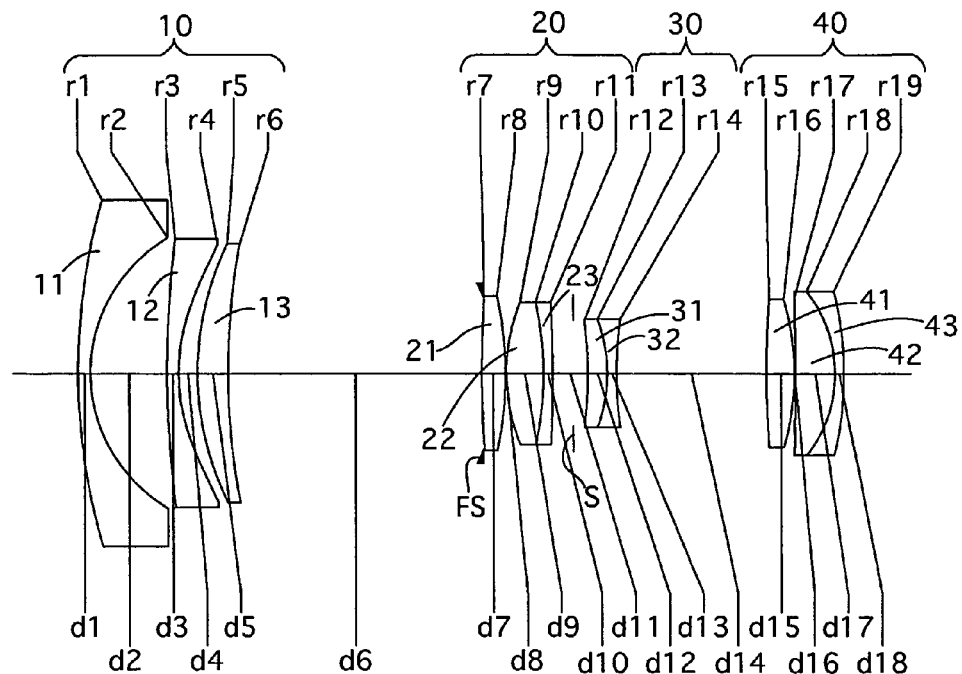
FIG. 25 is a lens arrangement of the zoom lens system at the short focal length extremity, according to a seventh embodiment of the present invention.
Figures 26A, 26B, 26C, 26D, 26E:
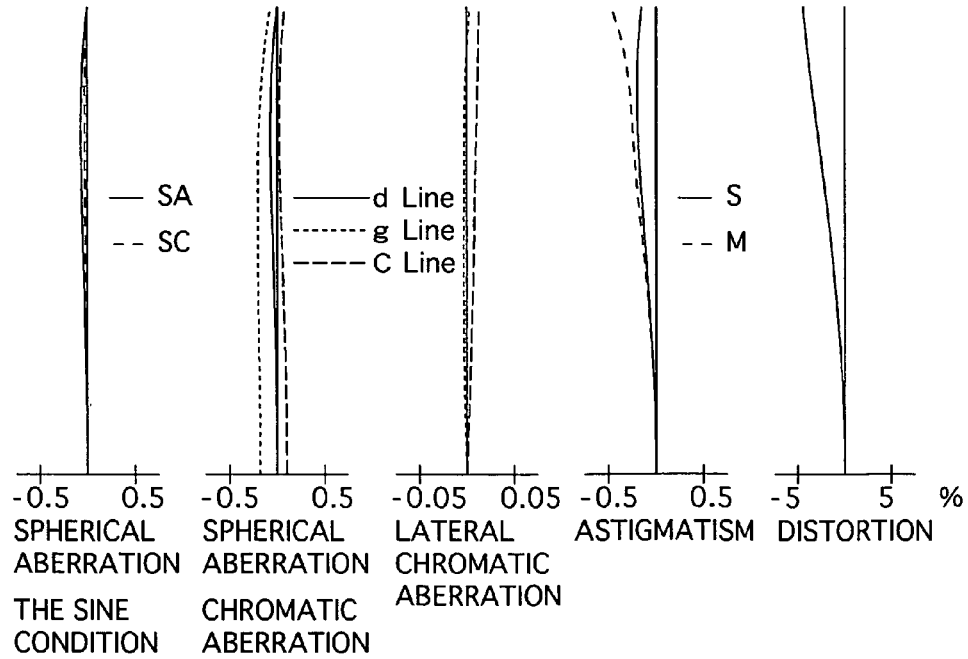
FIGS. 26A, 26B, 26C, 26D and 26E show aberrations occurred in the lens arrangement shown in FIG. 25.
Figure 27:
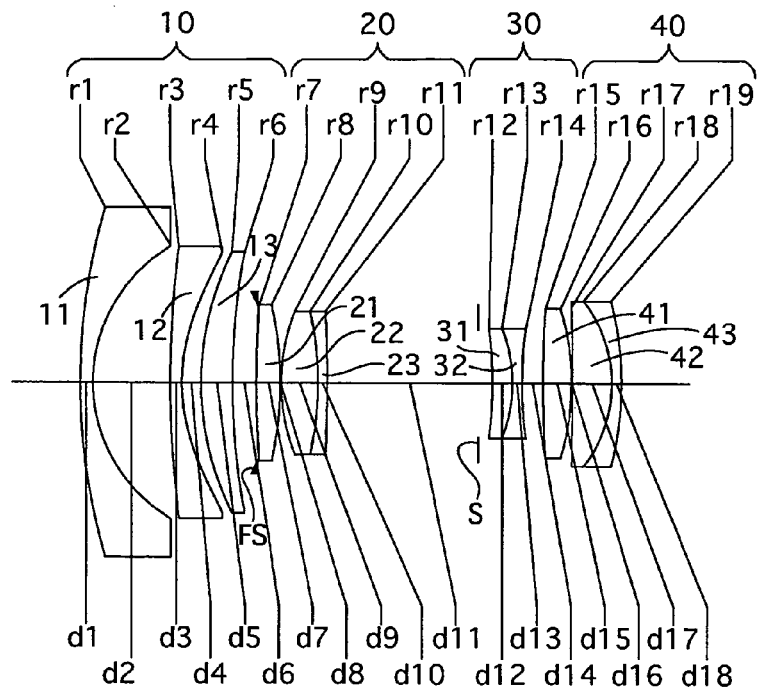
FIG. 27 is a lens arrangement of the zoom lens system at the long focal length extremity, according to the seventh embodiment of the present invention.
Figures 28A, 28B, 28C, 28D, 28E:
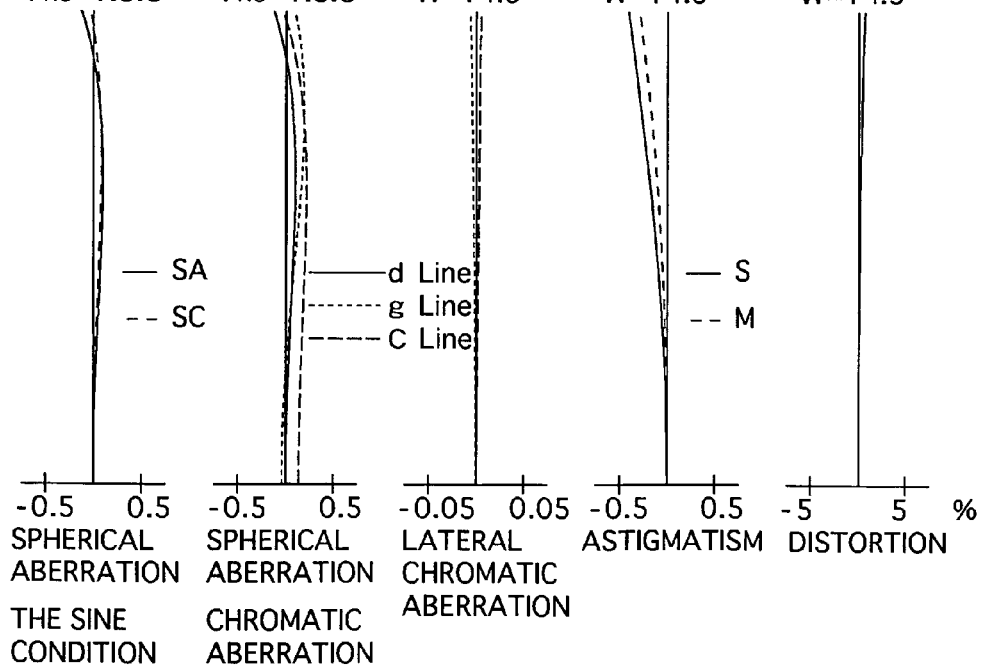
FIGS. 28A, 28B, 28C, 28D and 28E show aberrations occurred in the lens arrangement shown in FIG. 27.

FIG. 25 is the lens arrangement of the zoom lens system at the short focal length extremity, according to the seventh embodiment of the present invention. FIGS. 26A through 26E show aberrations occurred in the lens arrangement shown in FIG. 25. FIG. 27 is the lens arrangement of the zoom lens system at the long focal length extremity, according to the seventh embodiment of the present invention. FIGS. 28A through 28E show aberrations occurred in the lens arrangement shown in FIG. 27. Table 7 shows the numerical values of the seventh embodiment.

The basic lens arrangement and the positions of the diaphragms of the seventh embodiment are the same as those of the fourth and sixth embodiments.

The fixed-aperture diaphragm FS is provided 0.2 before the most object-side surface (surface No. 7) of the positive second lens group 20; and the variable-aperture diaphragm S is provided 1.50 before the most object-side surface (surface No. 12) of the negative third lens group 30.

TABLE 7

$F_{NO.} = 1:3.6-5.8$
$f = 18.52-53.00$
$W = 38.8-14.9$
$fB = 37.54-61.75$

| Surf. No. | r | d | Nd | ν |
|---|---|---|---|---|
| 1 | 67.301 | 1.30 | 1.62299 | 58.2 |
| 2 | 16.981 | 8.08 | — | — |
| 3 | 113.962 | 1.20 | 1.60793 | 50.5 |
| 4* | 19.814 | 1.98 | — | — |
| 5 | 31.470 | 3.26 | 1.80524 | 25.3 |
| 6 | 75.522 | 26.71-2.50 | — | — |
| 7 | 117.936 | 2.51 | 1.52682 | 51.8 |
| 8 | -38.752 | 0.10 | — | — |
| 9 | 20.698 | 3.90 | 1.48749 | 70.2 |
| 10 | -36.164 | 1.00 | 1.84666 | 23.8 |
| 11 | -153.476 | 3.70-17.27 | — | — |
| 12 | -46.578 | 2.06 | 1.80518 | 25.4 |
| 13 | -16.588 | 1.00 | 1.73147 | 50.2 |
| 14 | 43.771 | 15.77-2.20 | — | — |
| 15 | 132.973 | 2.93 | 1.60300 | 59.9 |
| 16 | -27.789 | 0.10 | — | — |
| 17 | -349.749 | 4.16 | 1.53664 | 45.9 |
| 18 | -14.513 | 1.00 | 1.80518 | 25.4 |
| 19 | -35.670 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 4 | $-0.27053 \times 10^{-4}$ | $-0.57717 \times 10^{-7}$ |

| Surf. No. | A8 | A10 |
|---|---|---|
| 4 | $0.77623 \times 10^{-10}$ | $-0.62272 \times 10^{-12}$ |

Embodiment 8

FIG. 29 is the lens arrangement of the zoom lens system at the short focal length extremity, according to the eighth embodiment of the present invention. FIGS. 30A through 30E show aberrations occurred in the lens arrangement shown in FIG. 29. FIG. 31 is the lens arrangement of the zoom lens system at the long focal length extremity, according to the eighth embodiment of the present invention. FIGS. 32A through 32E show aberrations occurred in the lens arrangement shown in FIG. 31. Table 8 shows the numerical values of the eighth embodiment.

In the eighth embodiment, the negative first lens group 10 includes a negative meniscus lens element 11 having the convex surface facing toward the object, a negative biconcave lens element 12 and a positive meniscus lens element 13, in this order from the object.

The remaining lens arrangement and the positions of the diaphragms of the eighth embodiment are the same as those of the second, third and fifth embodiments.

The fixed-aperture diaphragm FS is provided 0.2 behind the image-side surface (surface No. 8) of the biconvex positive lens element 21 of the positive second lens group 20; and the variable-aperture diaphragm S is provided 0.34 before the most object-side surface (surface No. 12) of the negative third lens group 30.

TABLE 8

$F_{NO.} = 1:3.6-6.0$
f = 19.00-55.38
W = 37.9-14.2
fB = 37.50-58.53

| Surf. No. | r | d | Nd | ν |
|---|---|---|---|---|
| 1 | 32.680 | 1.30 | 1.67603 | 57.9 |
| 2 | 15.632 | 11.68 | — | — |
| 3 | −407.545 | 1.25 | 1.57135 | 65.5 |
| 4* | 18.990 | 1.75 | — | — |
| 5 | 31.318 | 2.67 | 1.84700 | 23.8 |
| 6 | 59.821 | 23.53-2.50 | — | — |
| 7 | 46.984 | 2.99 | 1.52968 | 64.4 |
| 8 | −38.015 | 0.10 | — | — |
| 9 | 23.900 | 3.84 | 1.51310 | 64.6 |
| 10 | −29.230 | 1.00 | 1.84599 | 23.8 |
| 11 | −103.953 | 2.54-17.65 | — | — |
| 12 | −48.128 | 1.98 | 1.80518 | 25.4 |
| 13 | −17.925 | 1.20 | 1.74152 | 51.6 |
| 14 | 38.262 | 17.31-2.20 | — | — |
| 15 | 359.480 | 2.91 | 1.63912 | 45.4 |
| 16 | −24.482 | 0.10 | — | — |
| 17 | −5929.342 | 4.11 | 1.55394 | 43.4 |
| 18 | −14.721 | 1.10 | 1.80518 | 25.4 |
| 19 | −50.114 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 4 | $-0.33967 \times 10^{-4}$ | $-0.69420 \times 10^{-7}$ |

| Surf. No. | A8 | A10 |
|---|---|---|
| 4 | $0.12246 \times 10^{-9}$ | $-0.94063 \times 10^{-12}$ |

Embodiment 9

Figure 35:
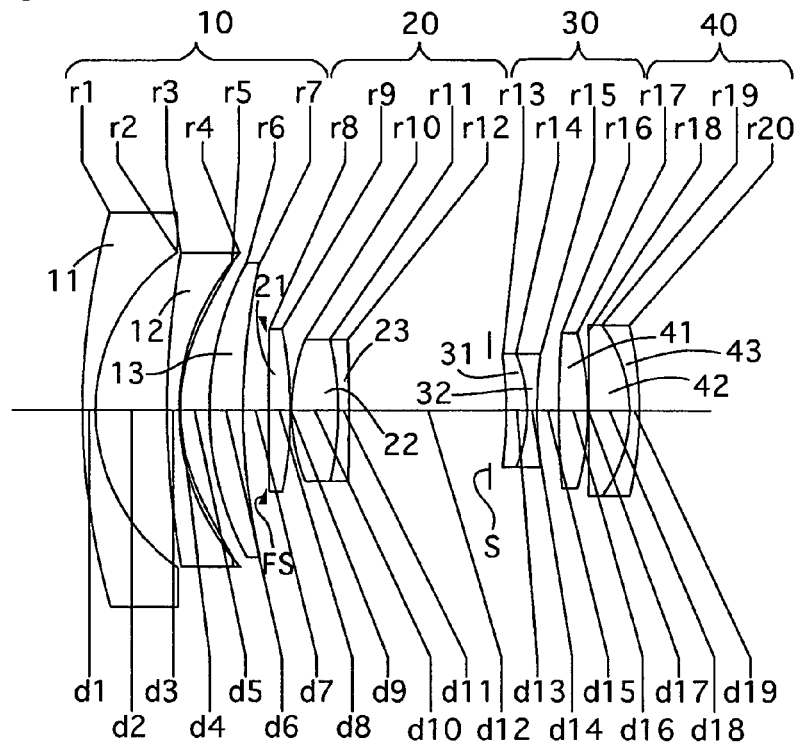
FIG. 35 is a lens arrangement of the zoom lens system at the long focal length extremity, according to the ninth embodiment of the present invention.
Figures 36A, 36B, 36C, 36D, 36E:
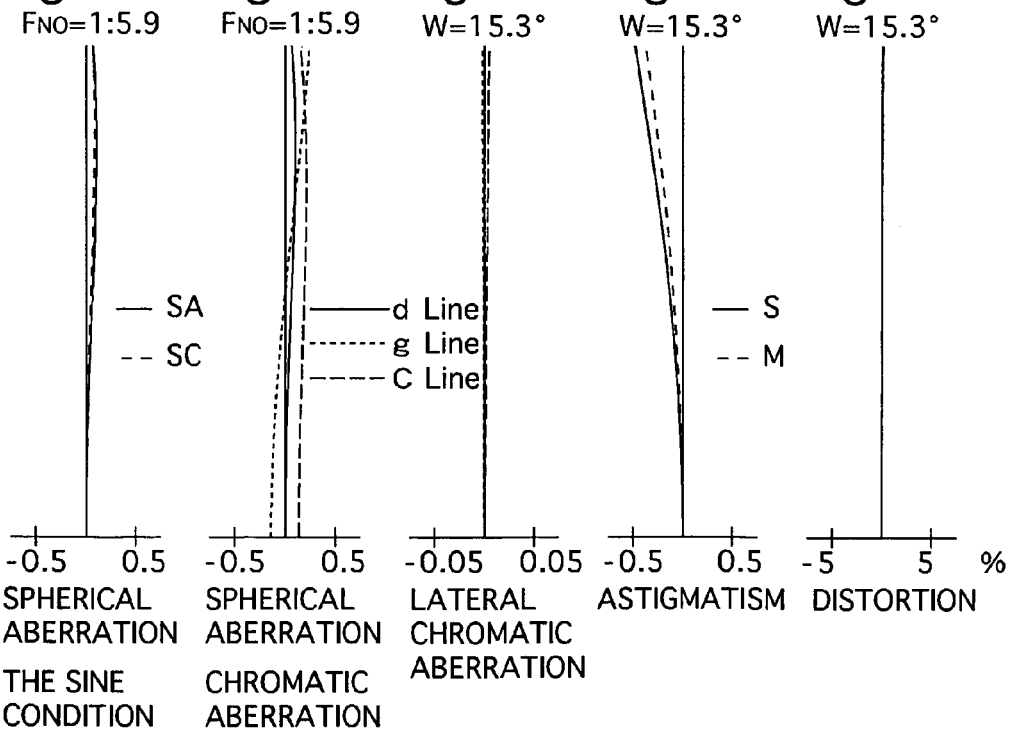
FIGS. 36A, 36B, 36C, 36D and 36E show aberrations occurred in the lens arrangement shown in FIG. 35.

FIG. 33 is the lens arrangement of the zoom lens system at the short focal length extremity, according to the ninth embodiment of the present invention. FIGS. 34A through 34E show aberrations occurred in the lens arrangement shown in FIG. 33. FIG. 35 is the lens arrangement of the zoom lens system at the long focal length extremity, according to the ninth embodiment of the present invention. FIGS. 36A through 36E show aberrations occurred in the lens arrangement shown in FIG. 35. Table 9 shows the numerical values of the ninth embodiment.

The basic lens arrangement and the positions of the diaphragms of the ninth embodiment are the same as that of the fourth, sixth and seventh embodiments.

The fixed-aperture diaphragm FS is provided 0.2 before the most object-side surface (surface No. 8) of the positive second lens group 20; and the variable-aperture diaphragm S is provided 1.67 before the most object-side surface (surface No. 13) of the negative third lens group 30.

TABLE 9

$F_{NO.} = 1:3.6-5.9$
f = 18.41-52.00
W = 39.0-15.3
fB = 37.19-62.52

| Surf. No. | r | d | Nd | ν |
|---|---|---|---|---|
| 1 | 73.144 | 1.30 | 1.62299 | 58.2 |
| 2 | 19.719 | 7.29 | — | — |
| 3 | 92.496 | 1.20 | 1.65265 | 59.1 |
| 4 | 24.326 | 0.10 | 1.52972 | 42.7 |
| 5* | 19.155 | 2.85 | — | — |
| 6 | 32.276 | 3.33 | 1.84678 | 23.8 |
| 7 | 68.504 | 27.82-2.50 | — | — |
| 8 | 302.026 | 2.27 | 1.55552 | 43.5 |
| 9 | −40.662 | 0.10 | — | — |
| 10 | 19.624 | 4.72 | 1.48749 | 70.2 |
| 11 | −33.153 | 1.10 | 1.84666 | 23.8 |
| 12 | −227.921 | 3.87-15.79 | — | — |
| 13 | −41.573 | 2.09 | 1.84666 | 23.8 |
| 14 | −15.478 | 1.00 | 1.74711 | 43.2 |
| 15 | 46.805 | 14.12-2.20 | — | — |
| 16 | 96.825 | 2.95 | 1.68310 | 48.3 |
| 17 | −29.253 | 0.10 | — | — |
| 18 | −804.997 | 4.09 | 1.51601 | 50.3 |
| 19 | −14.963 | 1.00 | 1.80518 | 25.4 |
| 20 | −37.810 | — | — | — |

The symbol * designates the aspherical surface which is rotationally symmetrical with respect to the optical axis.

Aspherical surface data (the aspherical surface coefficients not indicated are zero (0.00)):

| Surf. No. | A4 | A6 |
|---|---|---|
| 5 | $-0.26706 \times 10^{-4}$ | $-0.55801 \times 10^{-7}$ |

| Surf. No. | A8 | A10 |
|---|---|---|
| 5 | $0.75773 \times 10^{-10}$ | $-0.49406 \times 10^{-12}$ |

The numerical values of each condition of each embodiment are shown in Table 10.

TABLE 10

| | | Emb. 1 | Emb. 2 | Emb. 3 | Emb. 4 | Emb. 5 | Emb. 6 | Emb. 7 | Emb. 8 | Emb. 9 |
|---|---|---|---|---|---|---|---|---|---|---|
| (1) | \|f3\|/fw | 1.43 | 1.62 | 1.36 | 1.85 | 1.57 | 1.64 | 1.80 | 1.47 | 1.80 |
| (1') | | | | | | | | | | |
| (1") | | | | | | | | | | |
| (2) | F4/fw | 1.70 | 1.98 | 1.77 | 1.92 | 1.83 | 1.84 | 1.91 | 1.97 | 1.75 |
| (2') | | | | | | | | | | |
| (2") | | | | | | | | | | |
| (3) | \|f1\|/fBw | 0.71 | 0.61 | 0.66 | 0.69 | 0.65 | 0.67 | 0.69 | 0.60 | 0.77 |
| (4) | F4/f2 | 1.27 | 1.53 | 1.39 | 1.31 | 1.36 | 1.32 | 1.32 | 1.61 | 1.09 |
| (5) | \|f1\|/(fw*ft)$^{1/2}$ | 0.83 | 0.73 | 0.79 | 0.83 | 0.78 | 0.81 | 0.82 | 0.69 | 0.92 |
| (6) | \|f1\|/fw | 1.41 | 1.24 | 1.33 | 1.41 | 1.32 | 1.37 | 1.39 | 1.19 | 1.55 |
| (7) | f2/fw | 1.34 | 1.30 | 1.28 | 1.47 | 1.35 | 1.40 | 1.45 | 1.23 | 1.60 |

As can be understood from Table 10, each of the first through ninth embodiments satisfies conditions (1) through (7), and as can be understood from the aberration diagrams in the Figures, the various aberrations are also relatively well corrected.

According to the above description, a negative-lead type zoom lens system of a four-lens-group arrangement, i.e., a negative first lens group, a positive second lens group, a negative third lens group and a positive fourth lens group, in this order from the object, which can simplify the structure of the negative third lens group and that of the positive fourth lens group, can be obtained; and the production costs of the zoom lens system can be reduced.

Furthermore, the above negative-lead type zoom lens system of a four-lens-group arrangement can attain the following by appropriately distributing refractive power over each of the four lens groups:

(i) the angle-of-view of 75° or more at a focal length of 20 mm or less at the short focal length extremity;

(ii) the zoom ratio of approximately 3;

(iii) at the short focal length extremity, the back focal distance is long with respect to a focal length thereat; and (iv) off-axis aberration at the short focal length extremity and on-axis aberration at the long focal length extremity can be balanced when the necessary amount peripheral illumination is secured at the short focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group, a diaphragm, a negative third lens group, and a positive fourth lens group, in this order from an object, wherein said negative third lens group comprises cemented lens elements having a positive lens element and a negative lens element;

wherein said positive fourth lens group comprises a positive single lens element, and cemented lens elements having a positive lens element and a negative lens element, in this order from the object;

wherein said negative first lens group is a focusing lens group; and wherein said zoom lens system satisfies the following conditions:

$$0.4 < |fi(i=1)|/fBw < 0.8$$

$$1.0 < fi(i=4)/fi(i=2)/ < 1.8$$

wherein fi designates the focal length of the $i^{th}$ lens group ($1 \leq i \leq 4$); and fBw designates the back focal distance at the short focal length extremity.

2. The zoom lens system according to claim 1, wherein said cemented lens elements of said positive fourth lens group have a positive refractive power and are arranged to position said positive lens element on the object side, and said negative lens element is on the image side.

3. The zoom lens system according to claim 1, satisfying the following conditions:

$$1.0 < |fi(i=3)|/fw < 2.5$$

$$1.3 < fi(i=4)/fw < 2.5$$

wherein fi designates the focal length of the $i^{th}$ lens group ($1 \leq i \leq 4$); and fw designates the focal length of said zoom lens system at the short focal length extremity.

4. The zoom lens system according to claim 1, satisfying following condition:

$$0.5 < |fi(i=1)|/(fw \times ft)^{1/2} < 1.2$$

wherein fi designates the focal length of the $i^{th}$ lens group ($1 \leq i \leq 4$);

fw designates the focal length of said zoom lens system at the short focal length extremity; and ft designates the focal length of said zoom lens system at the long focal length extremity.

5. The zoom lens system according to claim 1, wherein a fixed-aperture diaphragm is provided in the close vicinity of the most object-side lens element of said positive second lens group to limit an off-axis bundle of light rays at the short focal length extremity.

6. The zoom lens system according to claim 1, wherein a variable-aperture diaphragm is provided between said positive second lens group and said negative third lens group.

7. A zoom lens system comprises a negative first lens group, a positive second lens group, a diaphragm, a negative third lens group, and a positive fourth lens group, in this order from an object, wherein said negative first lens group is arranged to be a focusing lens group;

wherein said zoom lens system satisfies the following conditions:

$$0.4 < |fi(i=1)|/fBw < 0.8$$

$$1.0 < fi(i=4)/fi(i=2) < 1.8$$

$$1.3 < |fi(i=3)|/fw < 2.0$$

wherein fi designates the focal length of the $i^{th}$ lens group ($1 \leq i \leq 4$);

fBw designates the back focal distance at the short focal length extremity; and fw designates the focal length of the zoom lens system at the short focal length extremity.

8. The zoom lens system according to claim 7, satisfying the following condition:

$$0.5 < |fi(i=1)|/(fw \times ft)^{1/2} < 1.2$$

wherein fi designates the focal length of the $i^{th}$ lens group ($1 \leq i \leq 4$);

fw designates the focal length of said zoom lens system at the short focal length extremity; and ft designates the focal length of said zoom lens system at the long focal length extremity.

9. The zoom lens system according to claim 7, wherein a fixed-aperture diaphragm is provided in the close vicinity of the most object-side lens element of said positive second lens group to limit an off-axis bundle of light rays at the short focal length extremity.

10. The zoom lens system according to claim 7, wherein a variable-aperture diaphragm is provided between said positive second lens group and said negative third lens group.

11. The zoom lens system according to claim 7, satisfying the following conditions:

$$1.0 < |fi(i=1)|/fw < 1.8$$

$$1.2 < fi(i=2)/fw < 1.8$$

$$1.5 < fi(i=4)/fw < 2.2$$

wherein fi designates the focal length of the $i^{th}$ lens group($1 \leq i \leq 4$); and fw designates the focal length of the zoom lens system at the short focal length extremity.

12. A zoom lens system comprises a negative first lens group, a fixed-aperture diaphragm, a positive second lens group, a diaphragm, a negative third lens group, and a positive fourth lens group, in this order from an object, wherein:

said negative third lens group comprises cemented lens elements having a positive lens element and a negative lens element; and said positive fourth lens group comprises a positive single lens element, and cemented lens elements having a positive lens element and a negative lens element, in this order from the object said fixed-aperture diaphragm is provided proximate the most object-side lens element of said positive second lens group and is configured to limit an off-axis bundle of light rays at a short focal length extremity.

13. The zoom lens system according to claim 12, wherein said cemented lens elements of said positive fourth lens group have a positive refractive power and are arranged to position said positive lens element on the object side, and said negative lens element is on the image side.

14. The zoom lens system according to claim 12, satisfying the following conditions:

$$1.0 < |fi(i=3)|/fw < 2.5$$

$$1.3 < fi(i=4)/fw < 2.5$$

wherein fi designates the focal length of the $i^{th}$ lens group($1 \leq i \leq 4$); and fw designates the focal length of said zoom lens system at the short focal length extremity.

15. The zoom lens system according to claim 12, satisfying following condition:

$$0.5 < |fi(i=1)|/(fw \times ft)^{1/2} < 1.2$$

wherein fi designates the focal length of the $i^{th}$ lens group($1 \leq i \leq 4$);

fw designates the focal length of said zoom lens system at the short focal length extremity; and ft designates the focal length of said zoom lens system at the long focal length extremity.

16. The zoom lens system according to claim 12, wherein said diaphragm is a variable-aperture diaphragm provided between said positive second lens group and said negative third lens group.

17. The zoom lens system according to claim 12, wherein at least one of said fixed-aperture diaphragm and said diaphragm are movable along an optical axis during a zooming operation.

18. A zoom lens system comprising a negative first lens group, a fixed-aperture diaphragm, a positive second lens group, a diaphragm, a negative third lens group, and a positive fourth lens group, in this order from an object, wherein:

said negative first lens group is arranged to be a focusing lens group;

said fixed-aperture diaphragm is provided proximate the most object-side lens element of said positive second lens group and is configured to limit an off-axis bundle of light rays at a short focal length extremity; and said zoom lens system satisfies the following conditions:

$$0.4 < |fi(i=1)|/fBw < 0.8$$

$$1.0 < fi(i=4)/fi(i=2) < 1.8$$

wherein fi designates the focal length of the $i^{th}$ lens group($1 \leq i \leq 4$); and fBw designates the back focal distance at the short focal length extremity.

19. The zoom lens system according to claim 18, satisfying the following condition:

$$0.5 < |fi(i=1)|/(fw \times ft)^{1/2} < 1.2$$

wherein fi designates the focal length of the $i^{th}$ lens group($1 \leq i \leq 4$);

fw designates the focal length of said zoom lens system at the short focal length extremity; and ft designates the focal length of said zoom lens system at the long focal length extremity.

20. The zoom lens system according to claim 18, wherein said diaphragm is a variable-aperture diaphragm provided between said positive second lens group and said negative third lens group.

21. The zoom lens system according to claim 18, satisfying the following conditions:

$$1.0 < |fi(i=1)|/fw < 1.8$$

$$1.2 < fi(i=2)/fw < 1.8$$

$$1.5 < fi(i=4)/fw < 2.2$$

wherein fi designates the focal length of the $i^{th}$ lens group($1 \leq i \leq 4$); and fw designates the focal length of the zoom lens system at the short focal length extremity.

22. The zoom lens system according to claim 18, wherein at least one of said fixed-aperture diaphragm and said diaphragm are movable along an optical axis during a zooming operation.

* * * * *